United States Patent
Langenfeld

(10) Patent No.: US 9,664,270 B1
(45) Date of Patent: May 30, 2017

(54) HYDROSTATIC TRANSMISSION

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 647 days.

(21) Appl. No.: 13/960,567

(22) Filed: Aug. 6, 2013

Related U.S. Application Data

(60) Provisional application No. 61/679,909, filed on Aug. 6, 2012.

(51) Int. Cl.
   *F16H 39/10* (2006.01)
   *F16H 39/42* (2006.01)

(52) U.S. Cl.
   CPC .............. *F16H 39/42* (2013.01); *F16H 39/10* (2013.01)

(58) Field of Classification Search
   CPC .... F16H 39/42; F16H 2039/105; F16H 61/40; F16H 61/42; F16H 61/46; F16H 39/10
   USPC .............................................. 60/487; 61/437
   See application file for complete search history.

(56) References Cited

U.S. PATENT DOCUMENTS

| | | | |
|---|---|---|---|
| 252,339 A | 1/1882 | Trask |
| 2,165,895 A | 7/1939 | Joy |
| 2,279,887 A | 4/1942 | Hathorn |
| 2,413,393 A | 12/1946 | Vickers |
| 3,282,225 A | 11/1966 | Sunstrand |
| 3,293,848 A | 12/1966 | Kuze |
| 3,311,186 A | 3/1967 | Kamlukin |
| 3,422,767 A | 1/1969 | Vickers |
| 3,535,984 A | 10/1970 | Anderson |
| 4,748,898 A | 6/1988 | Hayashi et al. |
| 4,856,264 A | 8/1989 | Nishimura et al. |
| 4,899,542 A | 2/1990 | Iino |
| 4,934,252 A | 6/1990 | Giere |
| 4,987,796 A | 1/1991 | von Kaler et al. |
| 5,040,649 A | 8/1991 | Okada |
| 5,078,659 A | 1/1992 | von Kaler et al. |

(Continued)

FOREIGN PATENT DOCUMENTS

| EP | 1695609 A1 | 8/2006 |
|---|---|---|
| EP | 2591989 A1 | 11/2011 |

OTHER PUBLICATIONS

Misawa, K. & Ishikawa, T., "Small Hydrostatic Transmission for Walk-Behind Lawn Mower," Honda R & D Co., Ltd., Japan, Nov. 1, 1991, pp. 553-561.

*Primary Examiner* — F. Daniel Lopez
(74) *Attorney, Agent, or Firm* — Neal, Gerber & Eisenberg LLP

(57) ABSTRACT

A hydrostatic transmission includes a pump running surface and a motor running surface connected by internal porting formed in a housing member. A valve is disposed in the housing and connects a sump formed by the housing and the internal porting. A trunnion includes a first arm engaged to a swash plate to rotate the swash plate to vary the output of the pump, and a second arm which rotates with the first arm, the second arm having an operative end that is capable of opening the valve to permit a hydraulic connection between the internal porting and the sump through the valve bore when the trunnion is rotated to a predetermined position.

14 Claims, 22 Drawing Sheets

(56) References Cited

U.S. PATENT DOCUMENTS

| | | | | |
|---|---|---|---|---|
| 5,094,077 | A | 3/1992 | Okada | |
| 5,094,078 | A | 3/1992 | Nishimura et al. | |
| 5,119,632 | A | 6/1992 | Nishimura et al. | |
| 5,187,832 | A | 2/1993 | Meyer et al. | |
| 5,259,193 | A | 11/1993 | Maesaka et al. | |
| 5,412,947 | A | 5/1995 | Hirose | |
| 5,442,901 | A | 8/1995 | Niemela et al. | |
| 5,456,068 | A * | 10/1995 | Ishii | B60K 17/105 60/487 |
| 5,495,712 | A | 3/1996 | Yano et al. | |
| 5,497,623 | A | 3/1996 | Hauser | |
| 5,718,105 | A | 2/1998 | Irikura et al. | |
| 5,718,534 | A | 2/1998 | Neuling | |
| 5,809,781 | A | 9/1998 | Krantz | |
| 5,836,159 | A | 11/1998 | Shimizu et al. | |
| 5,860,884 | A | 1/1999 | Jolliff | |
| 5,971,881 | A | 10/1999 | Jolliff | |
| 6,003,625 | A | 12/1999 | Neuling | |
| 6,076,428 | A * | 6/2000 | Thoma | B60K 17/105 60/487 |
| 6,343,471 | B1 | 2/2002 | Thoma et al. | |
| 6,378,300 | B1 | 4/2002 | Johnson et al. | |
| 6,427,442 | B2 * | 8/2002 | Thoma | B60K 11/06 60/456 |
| 6,544,136 | B2 * | 4/2003 | Duan | F16H 48/18 475/88 |
| 6,681,570 | B2 | 1/2004 | Takada et al. | |
| 6,688,417 | B2 | 2/2004 | Hansell | |
| 6,755,019 | B1 * | 6/2004 | Phanco | B60K 17/105 60/489 |
| 6,904,748 | B2 | 6/2005 | Takada et al. | |
| 6,938,544 | B2 | 9/2005 | Backer et al. | |
| 7,017,343 | B2 | 3/2006 | Takada et al. | |
| 7,165,398 | B1 * | 1/2007 | Holder | F16H 61/435 60/487 |
| 7,234,385 | B2 | 6/2007 | Dong et al. | |
| 7,373,871 | B1 * | 5/2008 | Buescher | F16H 39/14 92/12.2 |
| 7,510,035 | B1 | 3/2009 | Irikura | |
| 7,739,870 | B2 | 6/2010 | Carlson et al. | |
| 7,779,617 | B2 | 8/2010 | Wang et al. | |
| 8,371,404 | B2 | 2/2013 | Boeckler | |

* cited by examiner

HYDROSTATIC TRANSMISSION

CROSS-REFERENCE

This application claims the benefit of U.S. Provisional Patent Application No. 61/679,909 filed on Aug. 6, 2012, which is incorporated by reference herein in its entirety.

BACKGROUND OF THE INVENTION

This application relates to hydraulic drive mechanisms and hydrostatic transmissions generally and, in particular, to transmissions intended for use in driving a vehicle or other powered machine or apparatus, such as a walk-behind lawn mower.

SUMMARY OF THE INVENTION

An improved hydrostatic transmission is disclosed herein, as described in more detail below. The transmission can be mounted on a vehicle or other powered machine or apparatus.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
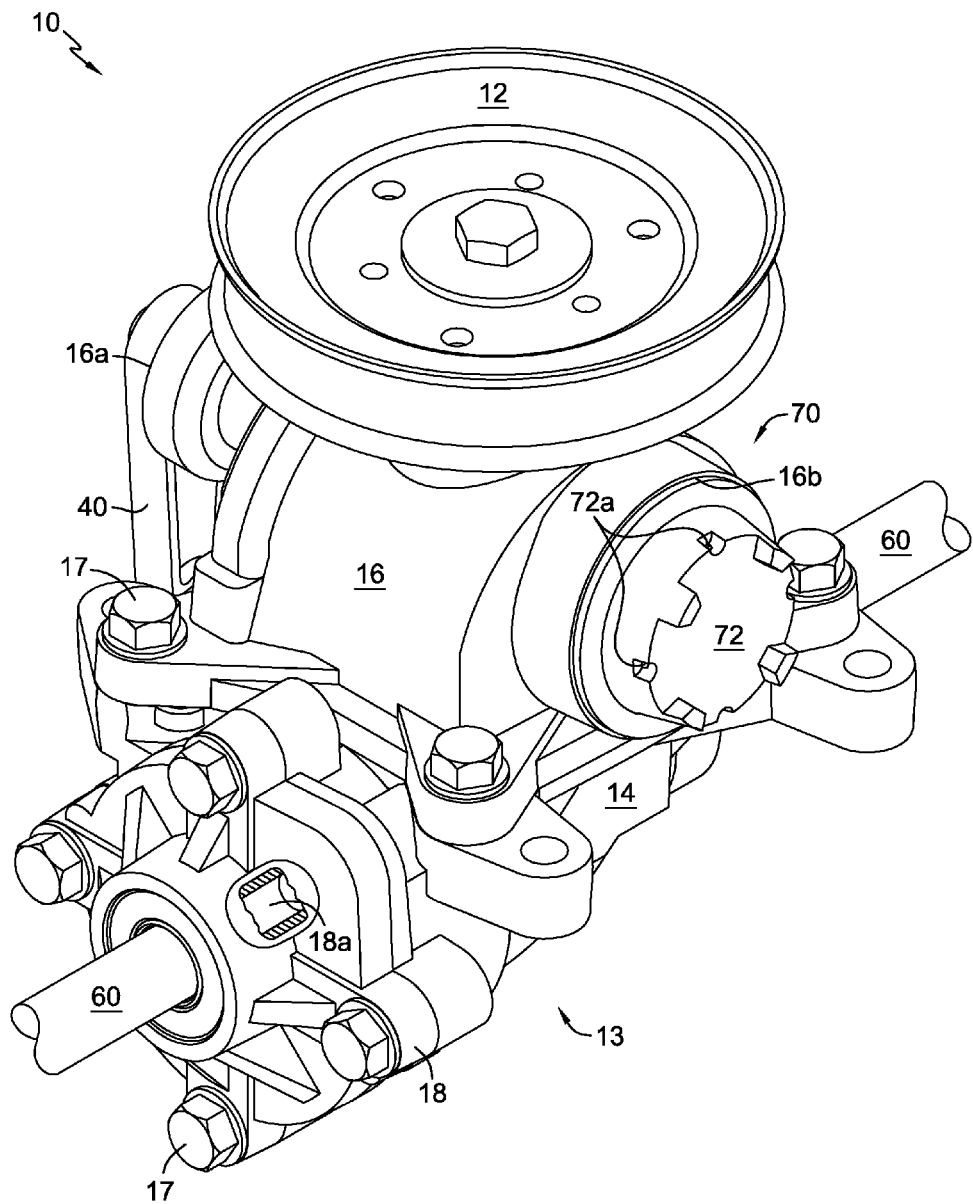
FIG. 1 is a perspective view of a first embodiment of a hydrostatic transmission.

The description that follows describes, illustrates and exemplifies one or more embodiments of the present invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, the present specification is intended to be taken as a whole and interpreted in accordance with the principles of the present invention as taught herein and understood by one of ordinary skill in the art. It will be further understood that for clarity in certain cross-sectional views, certain elements are not shown in cross-section, as doing so would not assist in the understanding of the invention.

Figure 4:
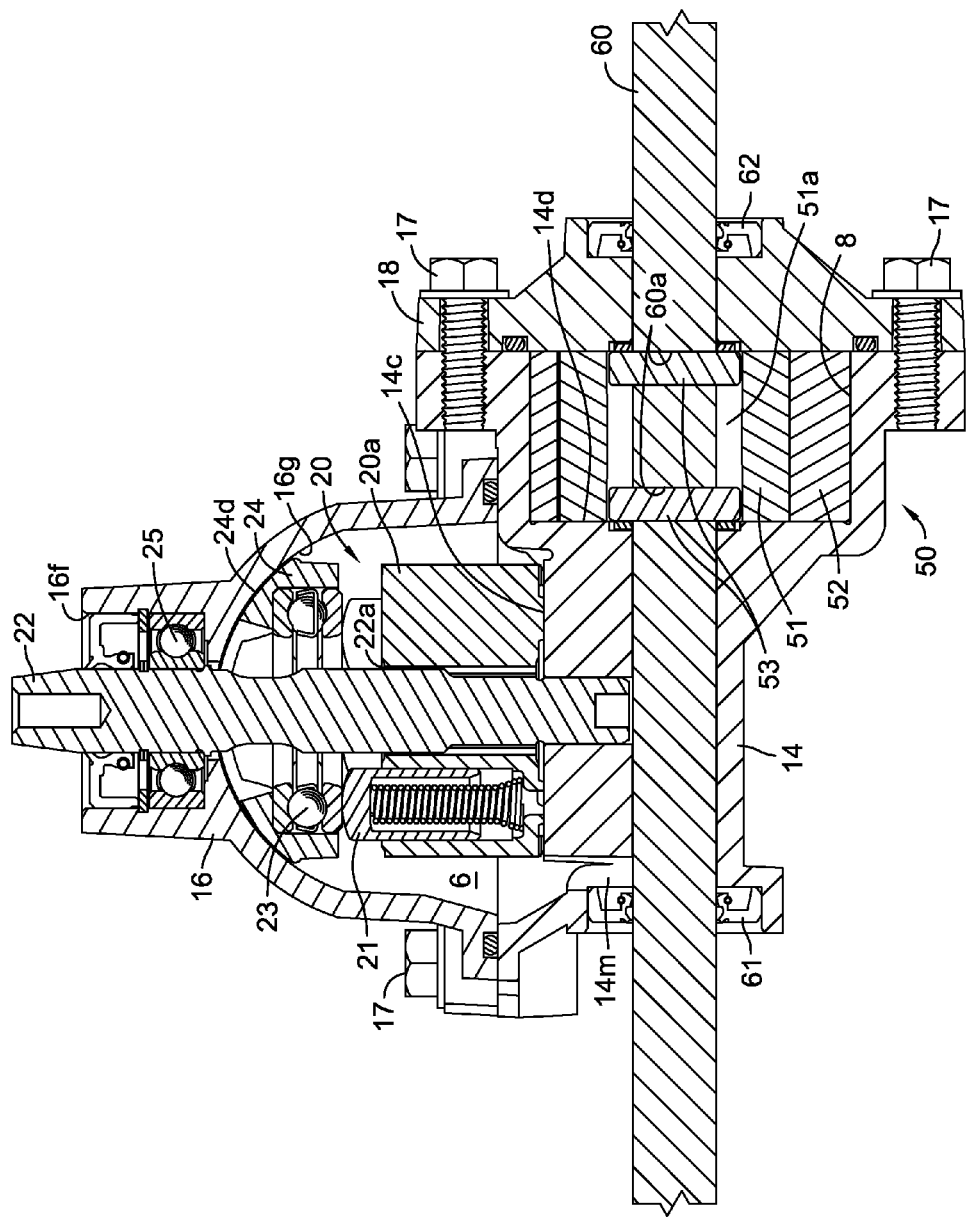
FIG. 4 is a cross-sectional view of the transmission of FIG. 3 along line 4-4 in FIG. 3.

FIGS. 1-7 illustrate an embodiment of a variable speed hydrostatic transmission 10. Transmission 10 generally includes a housing assembly 13, housing a pump assembly 20 coupled to and hydraulically driving a motor assembly 50. As depicted, pump assembly 20 is a variable displacement axial piston pump driven by an input shaft 22, while motor assembly 50 is a gerotor motor having an inner rotor 51 and outer rotor 52. The general designs and operation of the axial piston pump and gerotor motor are well-known in the art and will not be described in detail herein, except as noted below. An output shaft 60 of motor assembly 50 extends from both ends of housing assembly 13. The axis of rotation of output shaft 60 is generally perpendicular to the axis of input shaft 22. In transmission 10, the rotational axes of the input shaft 22 and the output shaft 60 are located on a common plane as shown in FIG. 4.

As illustrated in FIG. 1, input shaft 22 may have a pulley 12 secured to it capable of receiving a drive belt thereon (not shown) to power transmission 10. Optionally, with minor modification, input shaft 22 can be driven by other means of coupling either directly or indirectly to a prime mover (not shown). Various shaft coupling methods are well known and will not be described in detail herein. As shown in FIG. 4, input shaft 22 serves as a pump shaft and is drivingly engaged to a pump cylinder block 20a by means of a splined engagement 22a.

As illustrated, transmission 10 is a sealed unit having a housing assembly 13 enclosing an internal volume containing pump assembly 20 and motor assembly 50. Housing assembly 13 includes a main housing 14, a pump cover 16, and a motor cover 18 acting as first, second and third housing components. Pump cover 16 is secured to a first flange surface 14*a* (shown in FIG. 2) of main housing 14 to form a sump, namely pump chamber 6 about pump assembly 20. Motor cover 18 is secured to a second flange surface 14*b* (shown in FIG. 2) of main housing 14 to form a motor chamber 8 about motor assembly 50. Pump cover 16 and motor cover 18 are secured to the main housing 14 by a plurality of fasteners, such as screws 17 shown. Known sealing methods, such as an adhesive-sealant or a gasket can be used to seal these seams. As shown in FIG. 4, pump cover 16 has an opening 16*f* in which a first end of input shaft 22 is rotatably supported by bearing 25. The opposing end of input shaft 22 is rotatably supported by main housing 14.

Figure 6:
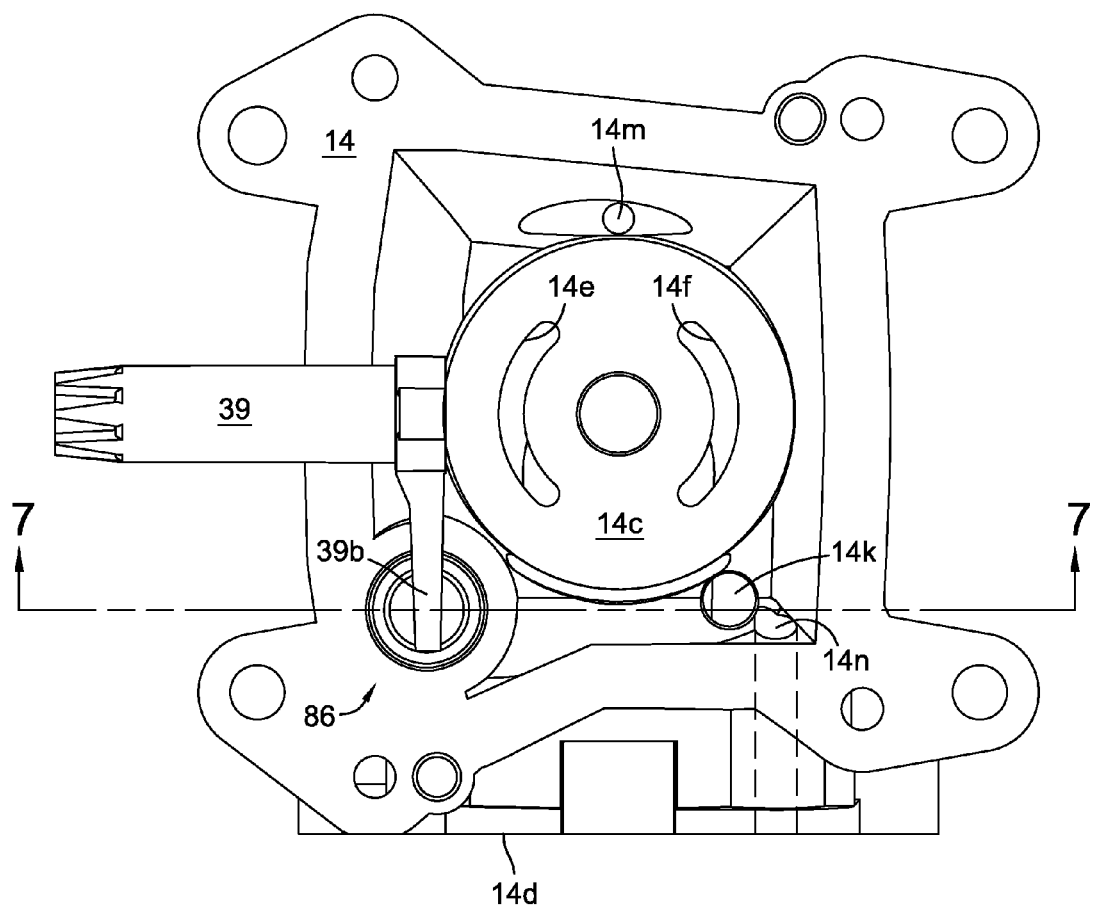
FIG. 6 is a plan view of a portion of the transmission of FIG. 1 with certain components removed for clarity.

Output shaft 60 is rotatably supported by motor cover 18 and main housing 14. Output shaft 60 is retained axially by pins 53 that are inserted in through-holes 60*a* formed in output shaft 60. Pins 53 are positioned in slot 51*a* formed in inner rotor 51 so that inner rotor 51 and output shaft 60 rotate together. A first output shaft seal 61 is provided in main housing 14 and a second output shaft seal 62 is provided in motor cover 18. As shown in FIGS. 4 and 6, a pressure relief passage 14*m* is formed in main housing 14 leading from pump chamber 6 to output shaft seal 61 to prevent over-pressurization of output shaft seal 61. This over-pressurization can be caused by rotation of output shaft 60 due to imperfections in the shape of output shaft 60 such that it acts as a pump. As shown in FIGS. 1 and 6, a pressure relief passage 14*n* is formed in main housing 14 and a pressure relief passage 18*a* leading from passage 14*n* to output shaft seal 62 is formed in motor cover 18. These pressure relief passages 14*n* and 18*a* cooperate to connect pump chamber 6 to output shaft seal 62 to similarly prevent over-pressurization of output shaft seal 62 caused by rotation of output shaft 60 or by pressurized leakage from motor assembly 50.

Main housing 14 also provides a pump running surface 14*c* for pump assembly 20 and a motor running surface 14*d* for motor assembly 50, with the pump running surface 14*c* oriented generally perpendicular to the motor running surface 14*d*. Hydraulic fluid passages 14*g*, 14*h* formed in main housing 14 permit fluid communication between the arcuate ports 14*e*, 14*f* formed on pump running surface 14*c* and corresponding ports (not shown) formed on motor running surface 14*d*, permitting the discharge of hydraulic fluid from pump assembly 20 to drive motor assembly 50 and its output shaft 60 in a known manner. Main housing 14 thereby eliminates the need for a separate center section containing such porting. It will be understood that the pump running surfaces depicted herein are shown without any additional valve plate between the pump and the running surface.

Figure 2:
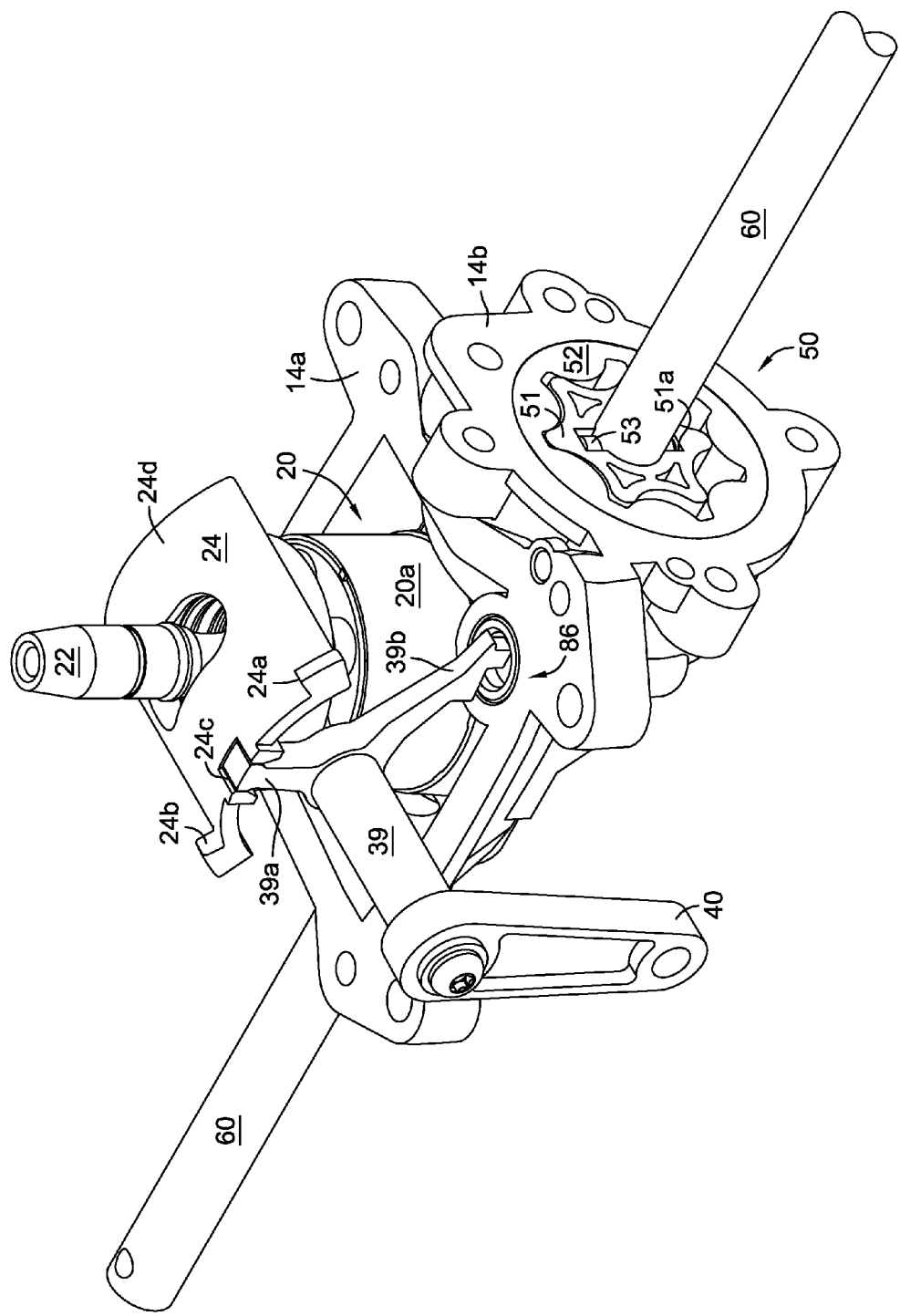
FIG. 2 is a perspective view of the transmission of FIG. 1 with certain components removed for clarity.
Figure 3:
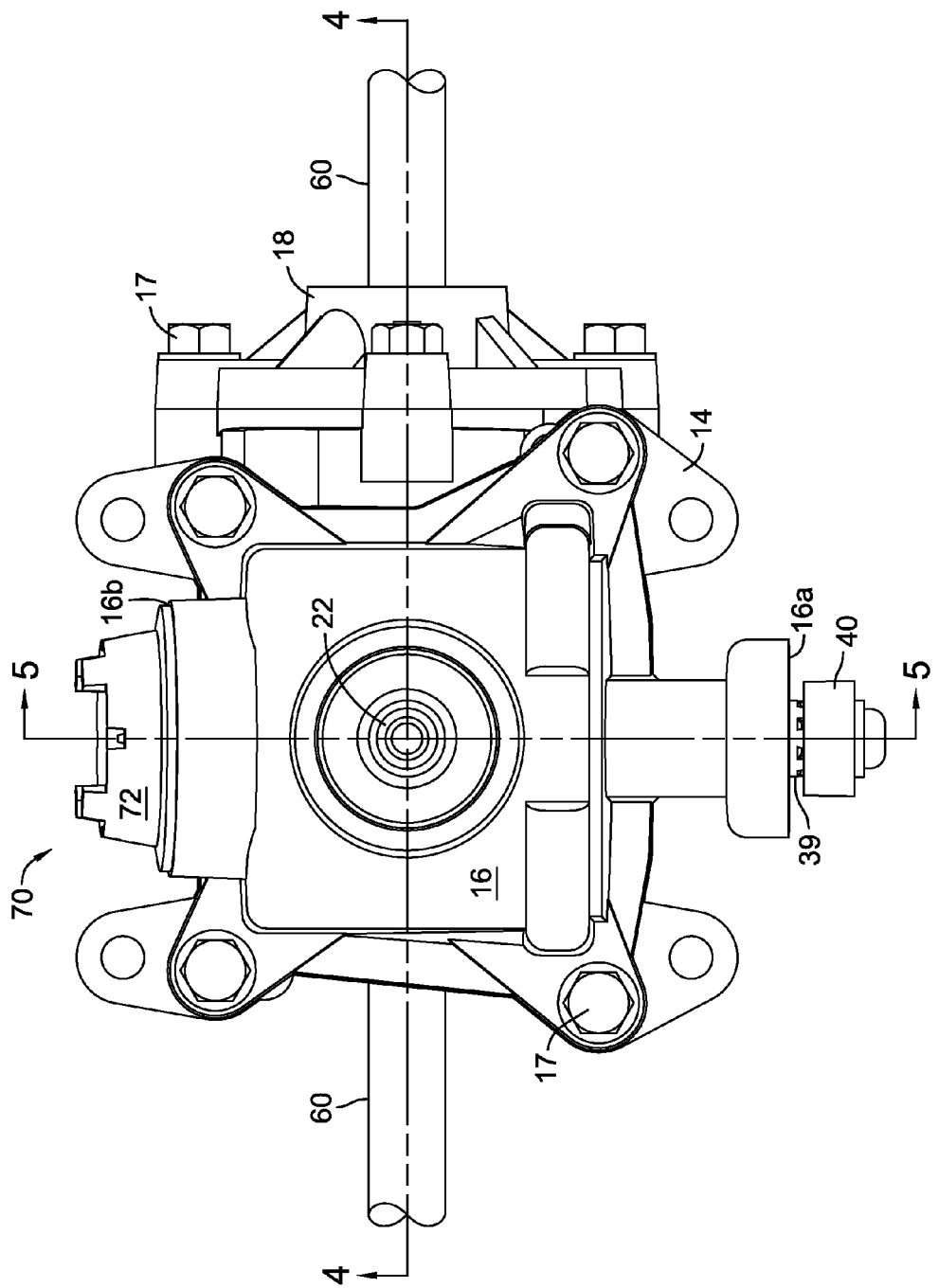
FIG. 3 is a plan view of the transmission of FIG. 1 with certain components removed for clarity.
Figure 5:
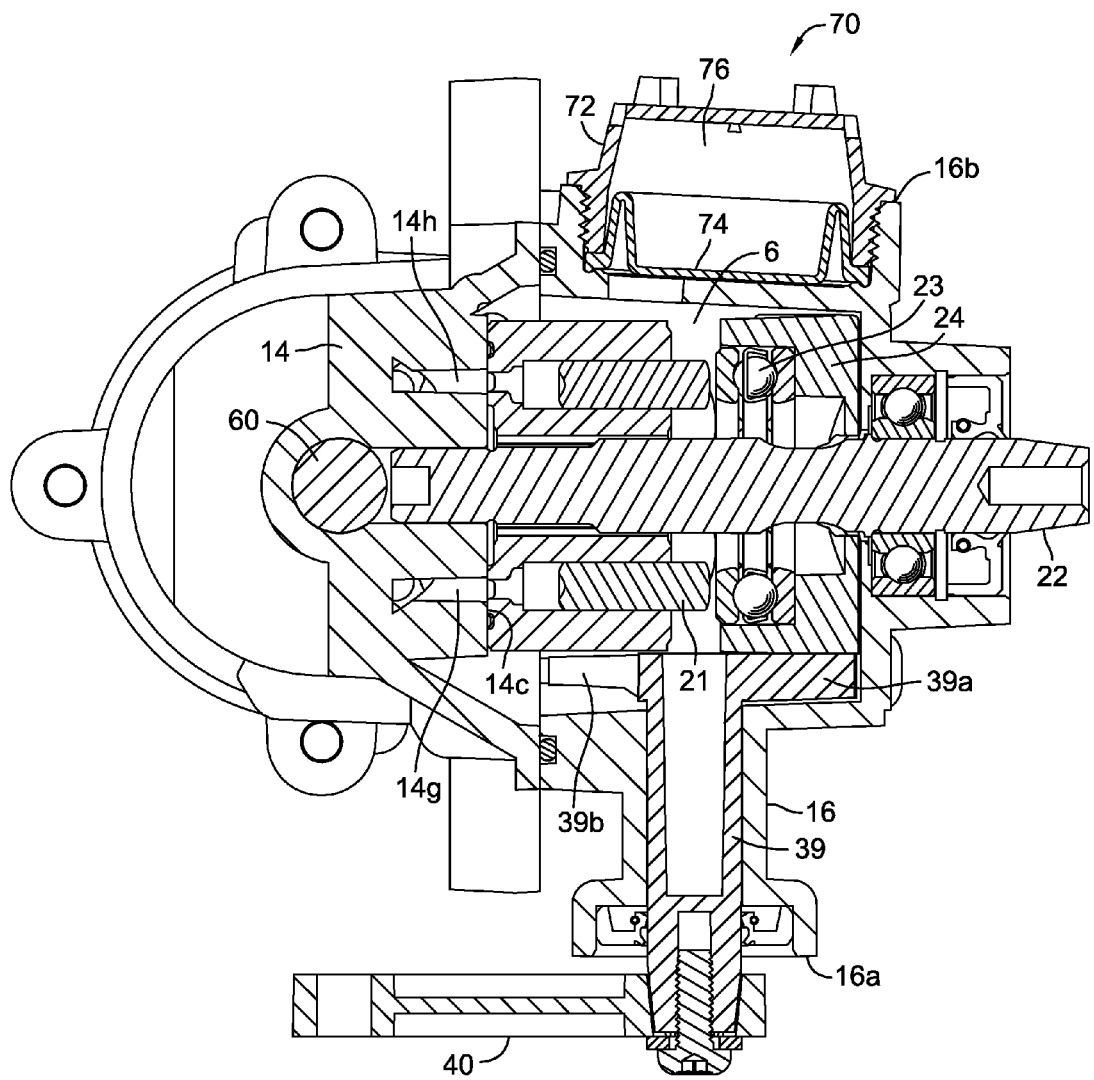
FIG. 5 is a cross-sectional view of the transmission of FIG. 3 along line 5-5 in FIG. 3.

As shown in FIGS. 2 and 5, the output of pump assembly 20 is adjustable via swash plate 24. A trunnion arm 39 for adjusting swash plate 24 passes through an opening 16*a* in a first side of pump cover 16. Trunnion arm 39 is connected to an external control arm 40 such that rotation of control arm 40 causes rotation of trunnion arm 39. Trunnion arm 39 has a first arm 39*a* that extends radially outward from its rotational axis and aligns with and engages a slot 24*c* formed in swash plate 24, such that rotation of trunnion arm 39 adjusts the rotational position of swash plate 24. As assembled, the convex surface 24*d* of swash plate 24 travels on the concave surface 16*g* of pump cover 16, which serves as a bearing. Swash plate 24 includes protrusions 24*a* and 24*b* that come into contact with stop features (not shown) formed in pump cover 16 to limit the rotational movement of swash plate 24 in a first and second direction, respectively. Trunnion arm 39 has a second arm 39*b*, which extends radially outward from the rotational axis so that its end is positioned proximate to a bypass valve 86, to serve as an actuator therefor. The function of bypass valve 86 is described in detail below.

The volume and direction of hydraulic fluid flow from pump assembly 20 is controlled by rotating control arm 40. A plurality of pistons 21 axially disposed in pump cylinder block 20*a* are in continuous contact with a thrust bearing 23 retained in swash plate 24. When an operator rotates control arm 40 in a clockwise or counterclockwise direction by means of controls and linkages (not shown), swash plate 24 is moved in an arc due to its engagement with first arm 39*a*. Movement of swash plate 24 changes the contact angle between the pistons 21 of pump cylinder block 20*a* and thrust bearing 23, thereby providing variable displacement hydraulic output to rotate motor assembly 50 at various speeds. As illustrated, neutral or zero displacement occurs when first arm 39*a* is generally parallel to input shaft 22, placing thrust bearing 23 in an orientation generally perpendicular to the axial direction of pistons 21. A swash plate and trunnion arm as shown herein is described in greater detail in commonly-owned U.S. Pat. No. 8,534,060, the disclosure of which is incorporated herein by reference. It should be understood that in the neutral position, subject to machining tolerances, second arm 39*b* does not crack bypass valve 86.

During a first or "forward" mode of operation (presuming input shaft 22 is driven in a clockwise rotational direction), when trunnion arm 39 is rotated from the neutral position in a first direction (counterclockwise for the embodiment shown in FIG. 2), the flow of hydraulic fluid from pump assembly 20 is increased, thus increasing the output speed of motor assembly 50 and its output shaft 60. In this first mode of operation, the second arm 39*b* does not engage or open bypass valve 86 and hydraulic fluid flows between pump assembly 20 and motor assembly 50 as previously described. Arcuate port 14*e* and fluid passage 14*g* represent the high pressure side of the hydraulic circuit, and arcuate port 14*f* and fluid passage 14*h* represent the low pressure side of the hydraulic circuit. Additionally, fluid passage 14*k* provides communication between the fluid volume in pump chamber 6 and the low pressure side of the hydraulic circuit, allowing make-up fluid to flow into passage 14*h* to replenish losses from the hydraulic circuit. Additionally, this pathway prevents reverse operation of transmission 10, effectively making the unit unidirectional.

Figure 7:
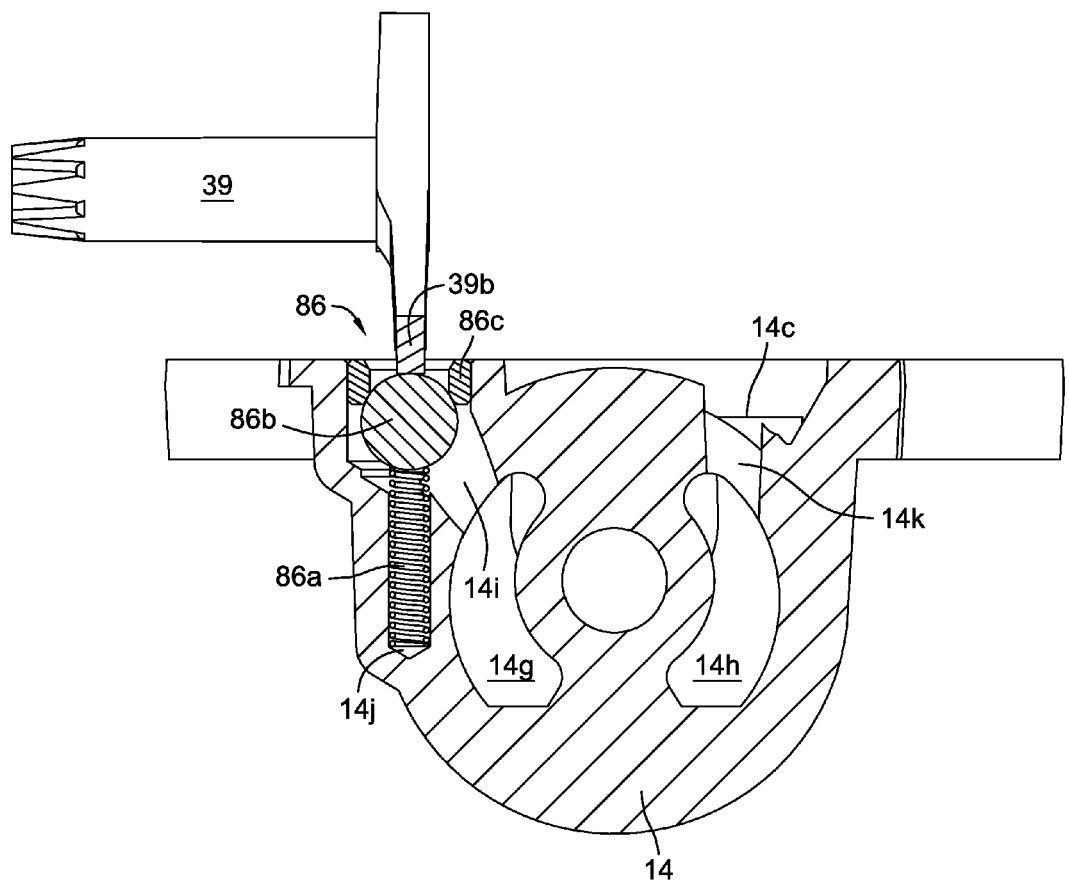
FIG. 7 is a cross-sectional view of a portion of the transmission of FIG. 6 along line 7-7 in FIG. 6.

As shown in FIG. 7, bypass valve 86 may be a ball and spring type check valve; however, other check valves known in the art may also be used in this application. Bypass valve 86 is positioned in bypass passage 14*i* between fluid passage 14*g* and pump chamber 6. Bypass valve 86 is biased to a closed position by a spring 86*a* housed in a spring pocket 14*j* formed in main housing 14. Spring 86*a* acts upon ball 86*b* to engage seat 86*c*, closing bypass valve 86. When bypass valve 86 is in the closed position, fluid communication from fluid passage 14*g* to pump chamber 6 is blocked, permitting fluid discharged from pump assembly 20 through arcuate port 14*e* to flow through fluid passage 14*g* and drive motor assembly 50 in the first mode of operation. Fluid pressure in bypass passage 14*i* assists in biasing bypass valve 86 to a closed position.

During a second or "bypass" mode of operation, trunnion arm 39 is rotated from the neutral position in a second, opposite direction (clockwise in FIG. 2) causing the second arm 39b to move ball 86b off seat 86c, opening bypass valve 86. Specifically, as trunnion arm 39 and swash plate 24 are rotated through the neutral position and into "reverse", passage 14h receives the discharge of pump assembly 20. Passage 14k connects passage 14h with pump chamber 6, and thus, provides a pathway for hydraulic fluid to circulate into pump chamber 6. The now open bypass valve 86 provides a return path for the hydraulic fluid back to pump assembly 20. This hydraulic circuit configuration is useful when, for example, the operator wishes to manually move the mower in reverse. The actuation of bypass valve 86 permits output shaft 60 to freely turn in reverse without hydraulic resistance. Conversely, at neutral with bypass valve 86 closed, a walk-behind mower so equipped cannot be pulled in reverse without difficulty.

Referring to FIGS. 1 and 5, an externally mounted fluid expansion bladder assembly 70 is provided to relieve case pressure from transmission 10 and prevent leakage of hydraulic fluid around various seals of transmission 10 as the fluid temperature rises and the fluid expands during operation of transmission 10. As shown in FIG. 1, bladder assembly 70 is located on pump cover 16 opposite control arm 40. Bladder assembly 70 is installed in an expansion bladder port 16b formed in pump cover 16. Port 16b can be internally threaded, as shown, to receive an expansion bladder cap 72. Expansion bladder assembly 70 comprises a chamber 76 defined on one end by the expansion bladder cap 72 and on the opposite end by a membrane 74, wherein membrane 74 seals off pump chamber 6 and is able to expand into chamber 76 to accommodate hydraulic fluid expansion. Expansion bladder cap 72 has a plurality of vents 72a open to outside air that permit the air volume in chamber 76 to be varied as hydraulic fluid volume varies with operating temperature.

Figure 9:
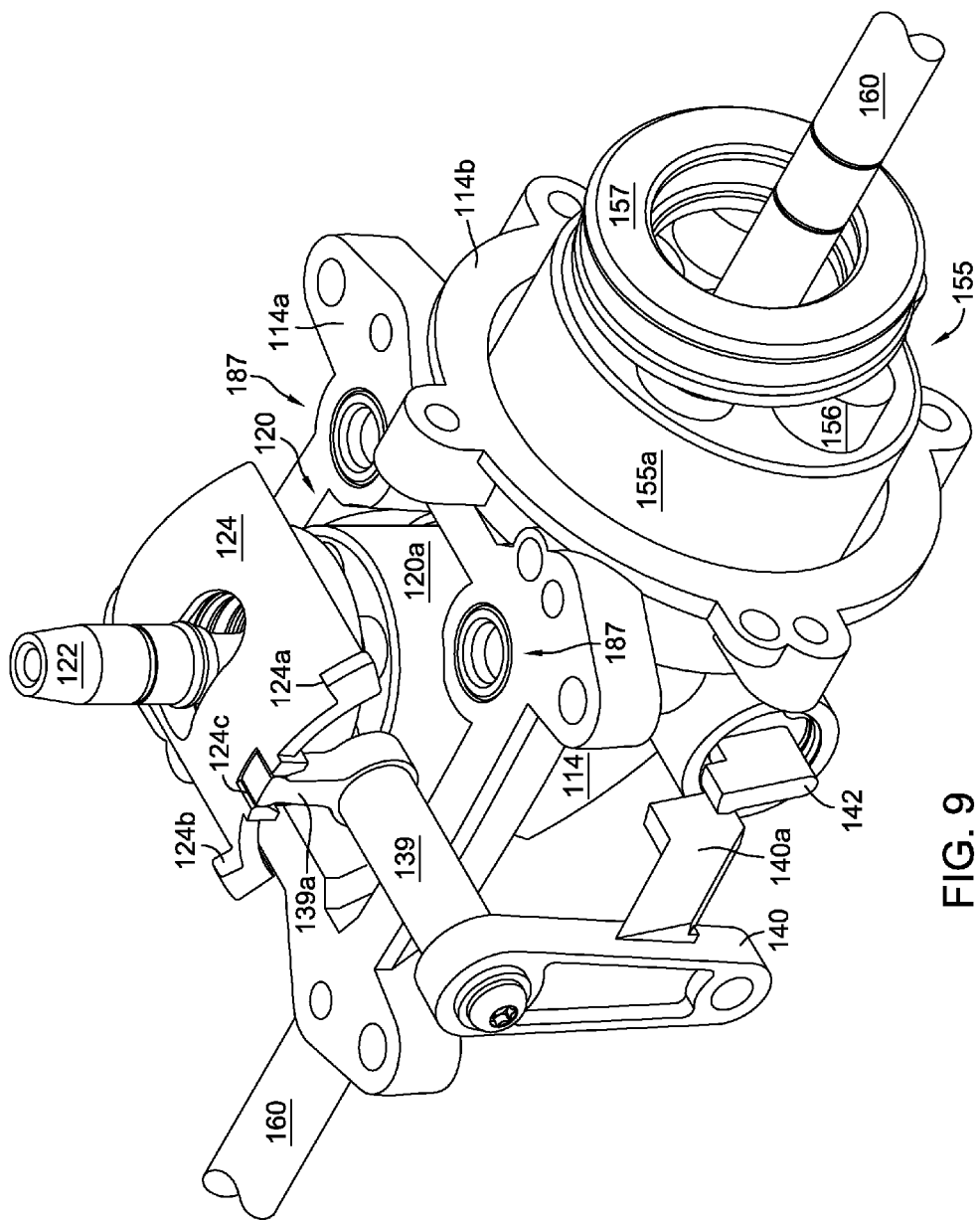
FIG. 9 is a perspective view of the transmission of FIG. 8 with certain components removed for clarity.
Figure 10:
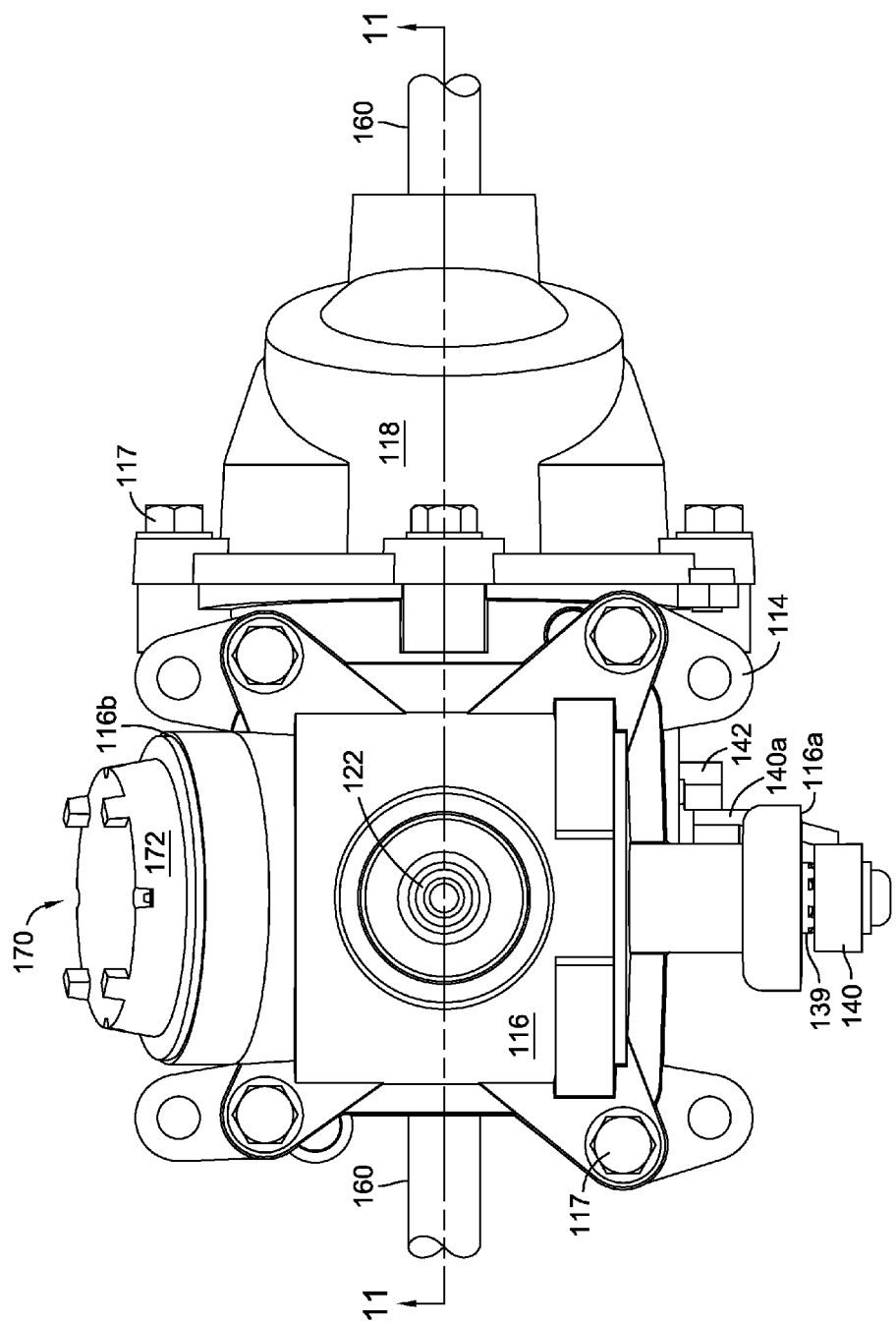
FIG. 10 is a plan view of the transmission of FIG. 8 with certain components removed for clarity.
Figure 11:
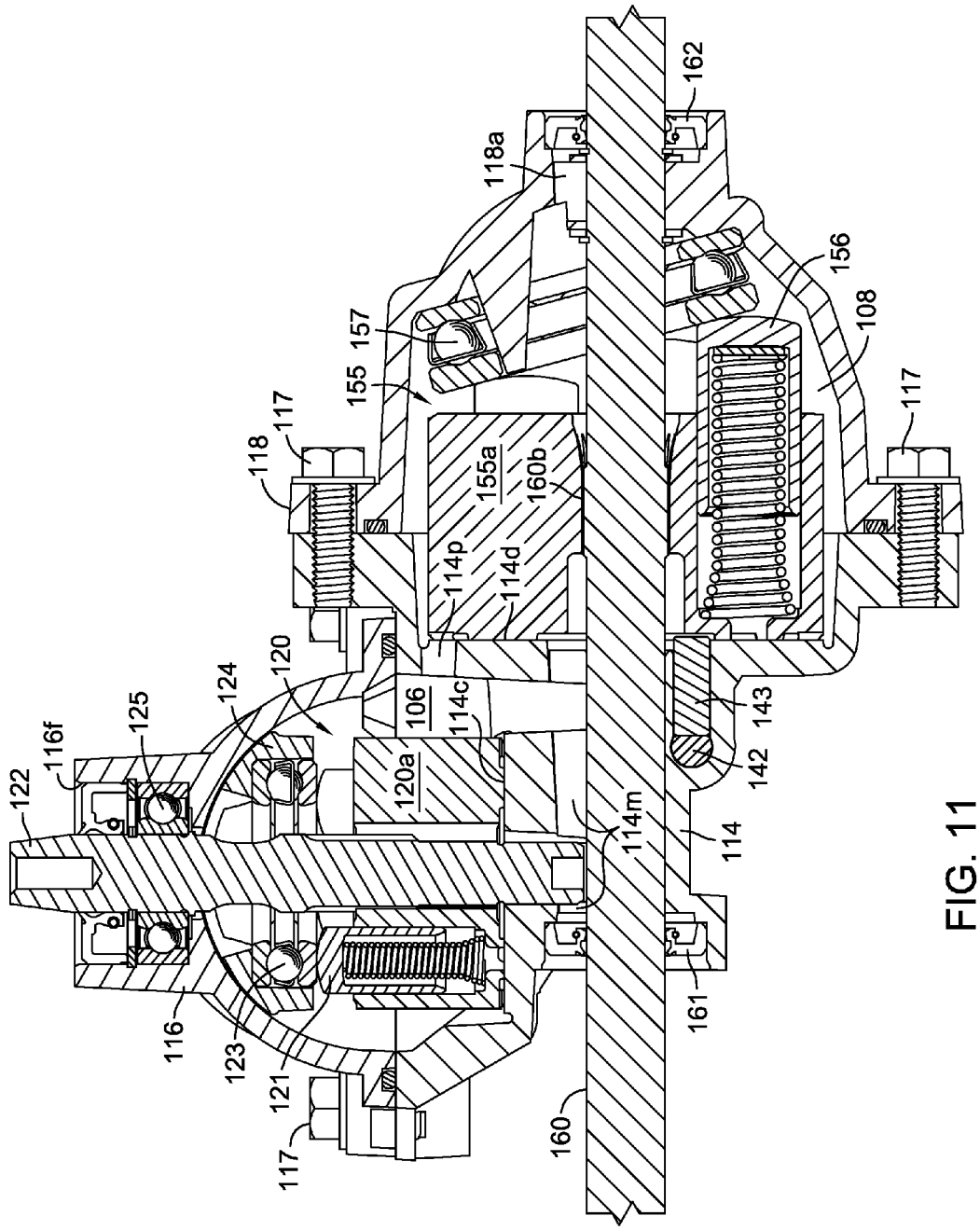
FIG. 11 is a cross-sectional view of the transmission of FIG. 10 along line 11-11 in FIG. 10.
Figure 12:
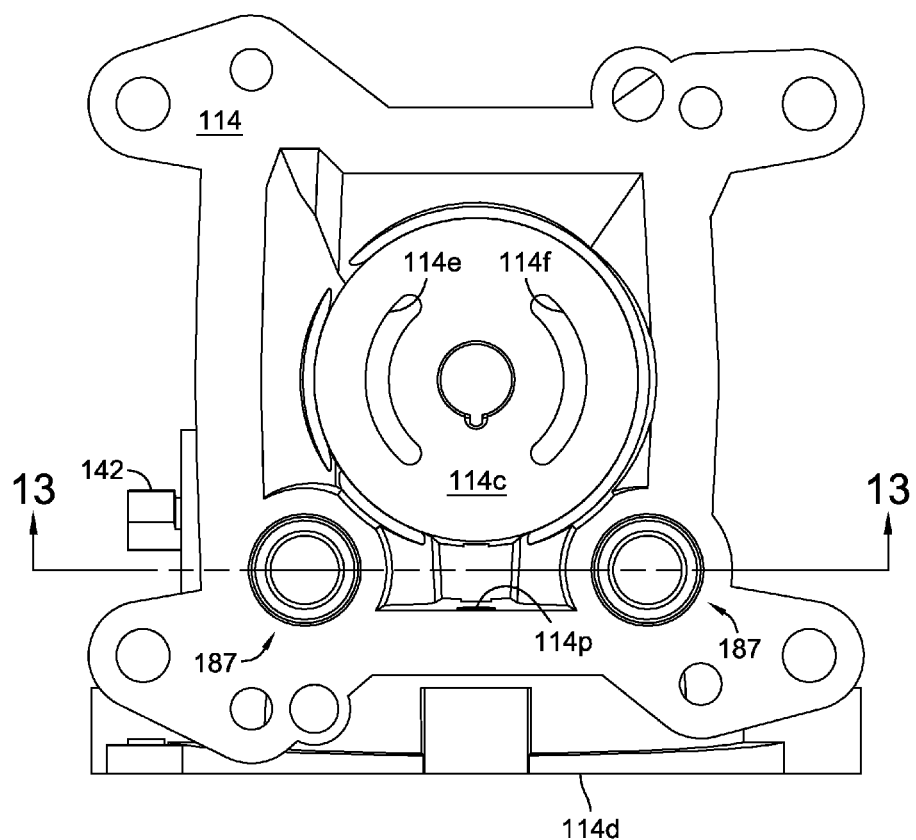
FIG. 12 is a plan view of a portion of the transmission of FIG. 8 with certain components removed for clarity.

FIGS. 8-13 illustrate a second embodiment of a variable speed hydrostatic transmission 110. Transmission 110 generally includes a housing assembly 113, housing a pump assembly 120 coupled to and hydraulically driving a motor assembly 155. As depicted, pump assembly 120 is a variable displacement axial piston pump driven by an input shaft 122, and motor assembly 155 is an axial piston motor having a motor cylinder block 155a and motor pistons 156 which bear against motor thrust bearing 157. The designs of the axial piston pump and motor are well-known in the art and will not be described in detail herein. An output shaft 160 of motor assembly 155 is engaged to and driven by motor cylinder block 155a and extends from both ends of housing assembly 113. Unlike the pinned engagement of inner rotor 51 and output shaft 60 for motor assembly 50, motor cylinder block 155a and output shaft 160 are joined by a splined engagement 160b, similar to that of the axial piston pump assemblies 20, 120 and their corresponding input shafts 22, 122, respectively. The axis of rotation of output shaft 160 is generally perpendicular to the axis of input shaft 122. In transmission 110, the rotational axes of the input shaft 122 and the output shaft 160 are located on a single plane as shown in FIG. 11.

Figure 8:
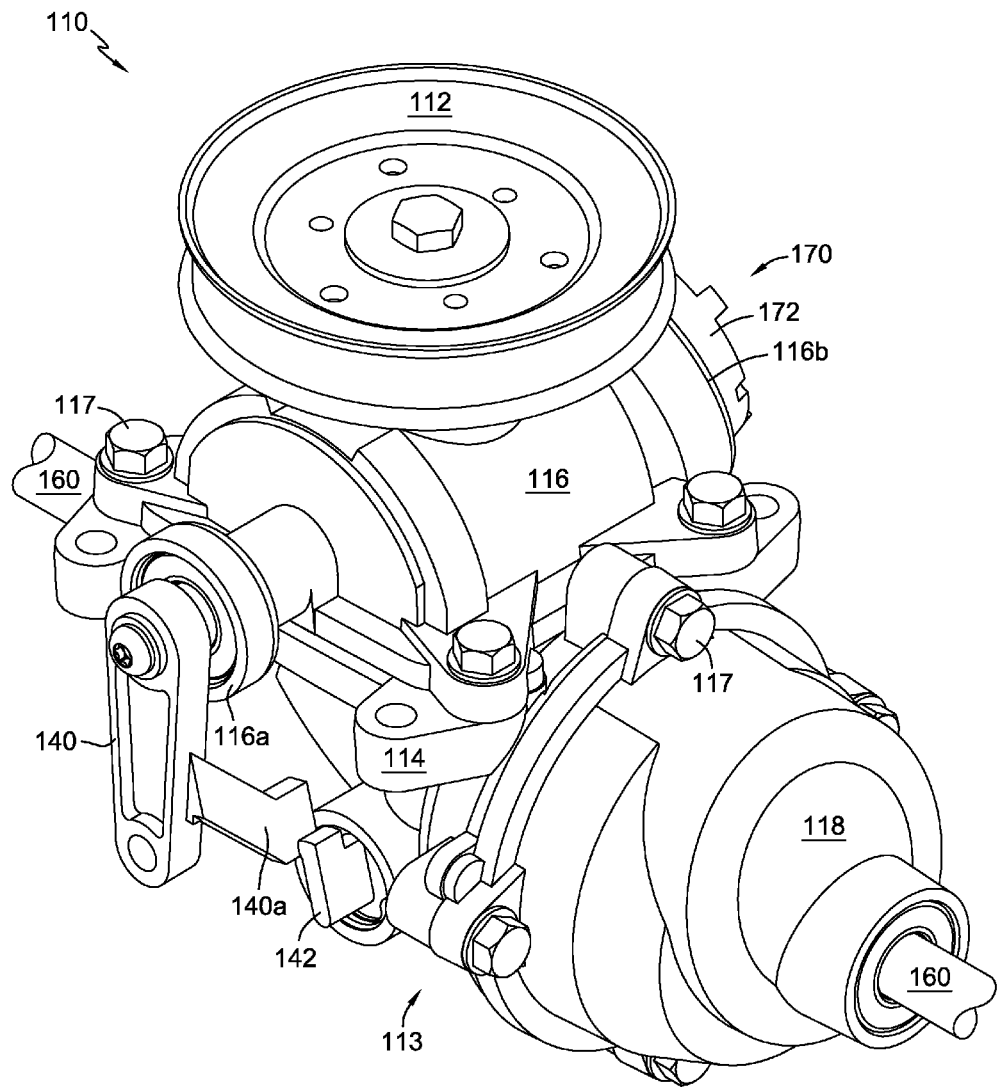
FIG. 8 is a perspective view of a second embodiment of a hydrostatic transmission.

As shown in FIG. 8, input shaft 122 may have a pulley 112 secured to it capable of receiving a drive belt thereon (not shown). Optionally, with minor modification, input shaft 122 can be driven by other means of coupling either directly or indirectly to a prime mover (not shown). As shown in FIG. 11, input shaft 122 serves as a pump shaft and is drivingly engaged to a pump cylinder block 120a.

As illustrated, transmission 110 is a sealed unit having a housing assembly 113 enclosing an internal volume containing pump assembly 120 and motor assembly 155. Housing assembly 113 includes a main housing 114, a pump cover 116, and a motor cover 118. Pump cover 116 is secured to a first flange surface 114a (shown in FIG. 9) of main housing 114 to form a pump chamber 106 about pump assembly 120. Motor cover 118 is secured to a second flange surface 114b (shown in FIG. 9) of main housing 114 to form a motor chamber 108 about motor assembly 155. Pump cover 116 and motor cover 118 are secured to the main housing 114 by a plurality of fasteners, such as screws 117 shown. As shown in FIG. 11, pump cover 116 has an opening 116f in which a first end of input shaft 122 is rotatably supported by bearing 125. The opposing end of input shaft 122 is rotatably supported by main housing 114.

Figure 13:
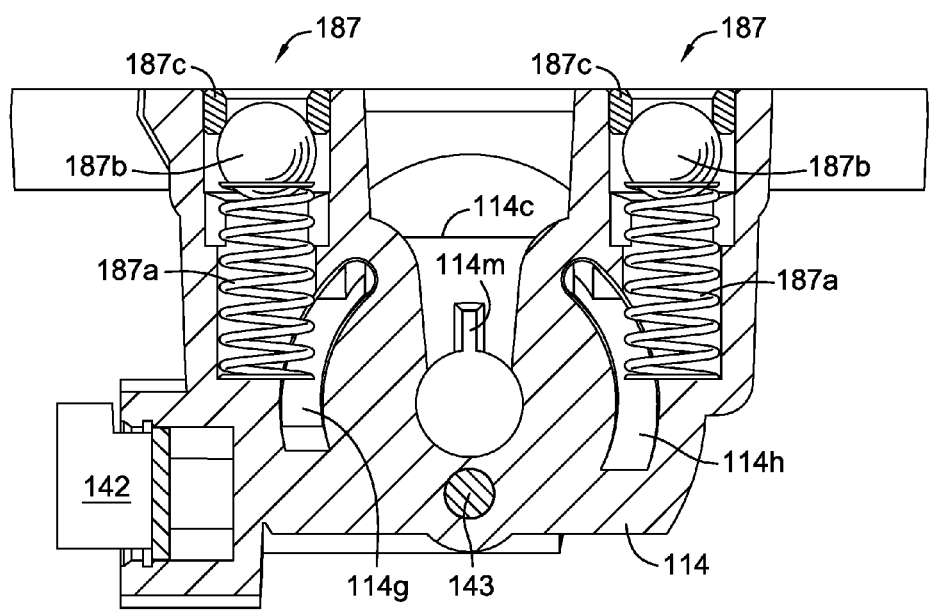
FIG. 13 is a cross-sectional view of a portion of the transmission of FIG. 12 along line 13-13 in FIG. 12.

Output shaft 160 is rotatably supported by motor cover 118 and main housing 114. A first output shaft seal 161 is provided in main housing 114 and a second output shaft seal 162 is provided in motor cover 118. As shown in FIGS. 11 and 13, a pressure relief passage 114m is formed in main housing 114 leading from pump chamber 106 to output shaft seal 161 to prevent over-pressurization of output shaft seal 161 caused by shaft rotation pumping effects. As shown in FIG. 11, a pressure relief passage 118a is formed in motor cover 118 leading from motor chamber 108 to output shaft seal 162 to similarly prevent over-pressurization of output shaft seal 162.

Similar to the main housing 14 of the previous embodiment, main housing 114 provides a pump running surface 114c for pump assembly 120 and a motor running surface 114d for motor assembly 155, with the pump running surface 114c oriented generally perpendicular to the motor running surface 114d. Hydraulic fluid passages 114g, 114h formed in main housing 114 permit fluid communication between the arcuate ports 114e, 114f formed on pump running surface 114c and corresponding ports (not shown) formed on motor running surface 114d, permitting the discharge of hydraulic fluid from pump assembly 120 to drive motor assembly 155 and its output shaft 160 in a known manner. Main housing 114 thereby eliminates the need for a separate center section containing such porting. A drain passage 114p formed in main housing 114 allows excess hydraulic fluid in motor chamber 108 to drain into pump chamber 106.

As shown in FIGS. 9-11, the output of pump assembly 120 is adjustable via swash plate 124. A trunnion arm 139 for adjusting swash plate 124 passes through an opening 116a in a first side of pump cover 116. Trunnion arm 139 is connected to a control arm 140 such that rotation of control arm 140 causes rotation of trunnion arm 139. Unlike trunnion arm 39 of the previous embodiment, trunnion arm 139 only has a singular arm 139a that extends radially outward from its rotational axis and aligns with and engages a slot 124c formed in swash plate 124, such that rotation of trunnion arm 139 adjusts the rotational position of swash plate 124. Swash plate 124 includes protrusions 124a and 124b that come into contact with stop features (not shown) formed in pump cover 116 to limit the rotational movement of swash plate 124 in a first and second direction, respectively. Control arm 140 has a bypass actuation arm 140a, which extends from control arm 140 so that its end is positioned proximate to bypass cam 142, the function of which is described in greater detail below.

Referring primarily to FIGS. 9 and 11, the volume and direction of hydraulic fluid flow from pump assembly 120 is controlled by rotating control arm 140. A plurality of pump pistons 121 axially disposed in pump cylinder block 120a are in continuous contact with a pump thrust bearing 123 retained in swash plate 124.

When an operator rotates control arm 140 in a clockwise or counterclockwise direction by means of controls and linkages (not shown), swash plate 124 is moved in an arc due to its engagement with arm 139*a*. Movement of swash plate 124 changes the contact angle between the pump pistons 121 of pump cylinder block 120*a* and pump thrust bearing 123, thereby providing variable displacement hydraulic output to rotate motor assembly 155 at various speeds. As illustrated, neutral or zero displacement occurs when arm 139*a* is generally parallel to input shaft 122, placing pump thrust bearing 123 in an orientation generally perpendicular to the axial direction of pump pistons 121. It is to be understood that bypass actuation arm 140*a* does not affect rotation of bypass cam 142, and hence bypass, at neutral.

During a first or "forward" mode of operation, when trunnion arm 139 is rotated from the neutral position in a first direction (clockwise for the embodiment shown in FIG. 9), the flow of hydraulic fluid from pump assembly 120 is increased, thus increasing the output speed of motor assembly 155 and its output shaft 160. The bypass cam 142 remains unaffected, and hydraulic fluid flows between pump assembly 120 and motor assembly 155 through the hydraulic circuit previously described. Depending upon the direction of rotation of input shaft 122, one of a pair of check valves 187 disposed in porting formed in main housing 114 between fluid passages 114*g*, 114*h*, respectively, and pump chamber 106 serves as a make-up valve to replace fluid losses during this first mode of operation.

As shown in FIG. 13, check valves 187 may be a ball and spring type check valve; however, other valves known in the art, such as combination check/relief valves may be used depending upon hydraulic circuit needs. Check valves 187 are biased to a closed position by a spring 187*a* acting upon a ball 187*b* to engage a seat 187*c*. When the fluid pressure in fluid passage 114*g* or 114*h* (in combination with the spring force of spring 187*a*) is lower than the fluid pressure in pump chamber 106, check valve 187 is cracked and make-up fluid is introduced into the hydraulic circuit.

During a second or "bypass" mode of operation, trunnion arm 139 is rotated from the neutral position in a second, opposite direction (counterclockwise in FIG. 9) causing bypass actuation arm 140*a* to bear upon and rotate bypass cam 142. As best shown in FIG. 11, bypass cam 142 in turn bears upon block lift pin 143 and causes block lift pin 143 to lift motor cylinder block 155*a* off running surface 114*d*. Consequently, hydraulic fluid flow between motor assembly 155 and pump assembly 120 is broken. Without a return of hydraulic fluid from motor assembly 155, pump assembly 120 may draw hydraulic fluid from pump chamber 106 through the other of the check valves 187, or directly from motor chamber 108 via the applicable fluid passage 114*g* or 114*h*. As a result, pump 120 is prevented from driving motor 155 in reverse and allows an operator of a walk-behind lawn mower, for example, to manually move the mower in reverse without encountering hydraulic resistance. It will be understood that the presence of bypass actuation arm 140*a* converts an otherwise bidirectional unit to a unidirectional unit.

As in the first embodiment, a fluid expansion bladder assembly 170 is provided to relieve case pressure from transmission 110 and prevent leakage of hydraulic fluid around various seals of transmission 110 as the hydraulic fluid temperature rises and the fluid expands during operation of transmission 110. As shown in FIGS. 8 and 10, bladder assembly 170 is located on pump cover 116 opposite control arm 140. Bladder assembly 170 can be of the same form and function as bladder assembly 70 and is installed in an expansion bladder port 116*b* formed in pump cover 116. Port 116*b* can be internally threaded to receive an expansion bladder cap 172.

FIGS. 14-22 illustrate a third embodiment of a variable speed hydrostatic transmission 210. It varies from the first and second embodiments in that the axis of rotation of its trunnion arm 239 is generally parallel, as opposed to perpendicular, to the axis of rotation of motor output shaft 260. In addition, its pump input shaft 222 is not substantially coplanar with its motor output shaft 260, being offset therefrom. These and other differences will be described in detail below.

Transmission 210 generally includes a housing assembly 213, housing a pump assembly 220 coupled to and hydraulically driving a motor assembly 255. As depicted, pump assembly 220 is a variable displacement axial piston pump driven by an input shaft 222, and motor assembly 255 is an axial piston motor having a motor cylinder block 255*a* and motor pistons 256 which bear against motor thrust bearing 257. The designs of the axial piston pump and motor are well-known in the art and will not be described in detail herein. An output shaft 260 of motor assembly 255 is driven by motor cylinder block 255*a* and extends from both ends of housing assembly 213. The axis of rotation of output shaft 260 is generally perpendicular to the axis of input shaft 222, but offset therefrom.

Figure 14:
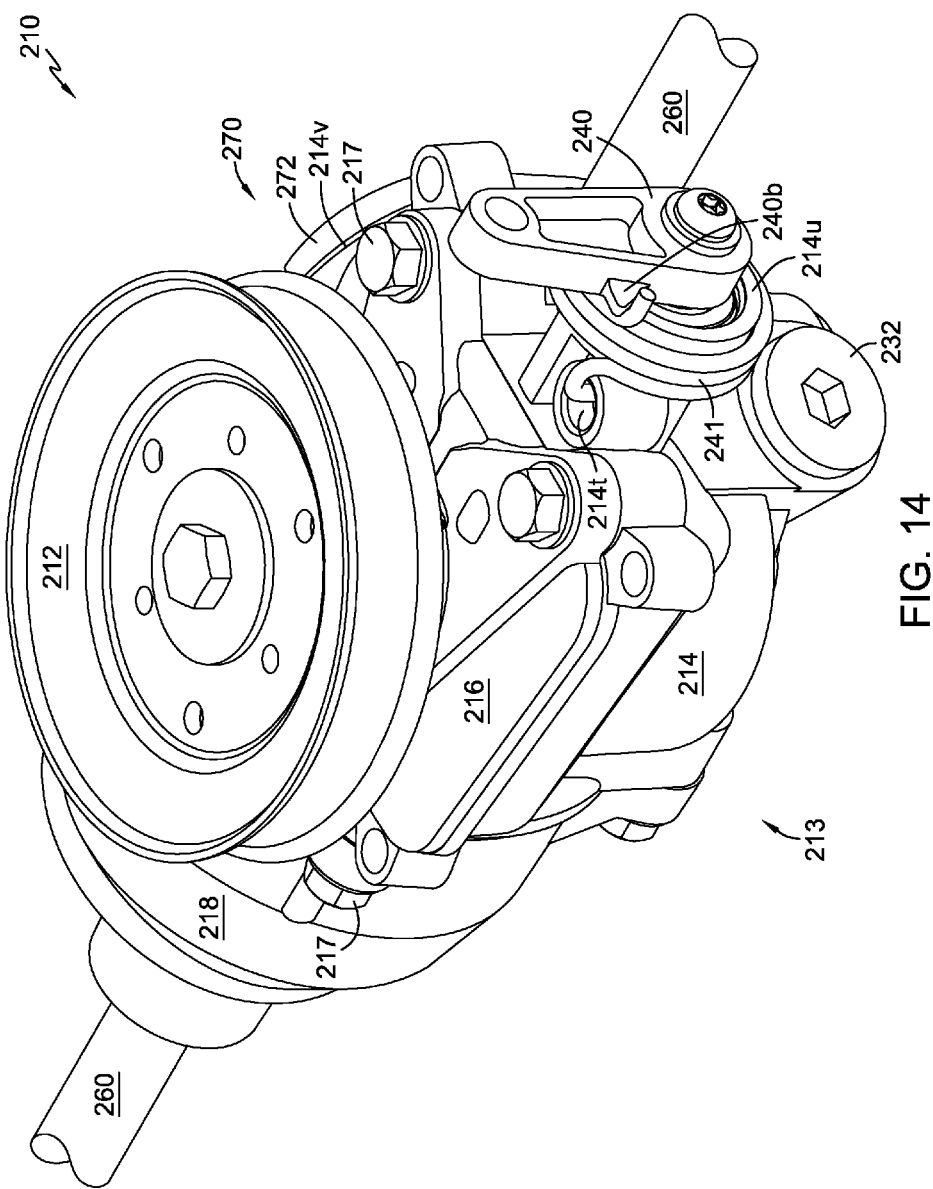
FIG. 14 is a perspective view of a third embodiment of a hydrostatic transmission.
Figure 17:
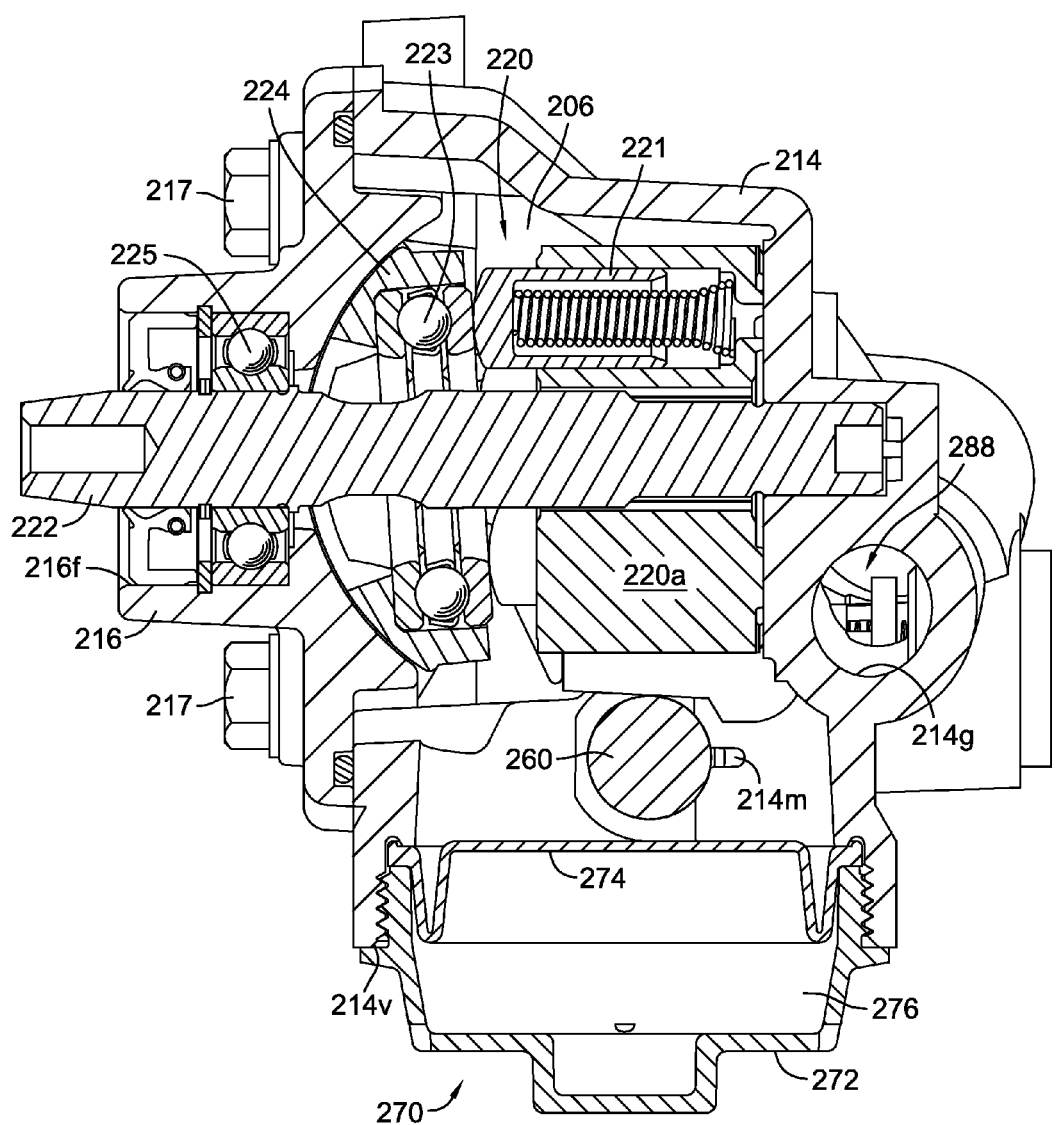
FIG. 17 is a cross-sectional view of a portion of the transmission of FIG. 16 along line 17-17 in FIG. 16.

As shown in FIG. 14, input shaft 222 may have a pulley 212 secured to it capable of receiving a drive belt thereon (not shown). Optionally, with minor modification, input shaft 222 can be driven by other means of coupling either directly or indirectly to a prime mover (not shown). As shown in FIG. 17, input shaft 222 serves as a pump shaft and is drivingly engaged to a pump cylinder block 220*a*.

As illustrated, transmission 210 is a sealed unit having a housing assembly 213 enclosing an internal volume containing pump assembly 220 and motor assembly 255. Housing assembly 213 includes a main housing 214, a pump cover 216, and a motor cover 218. Pump cover 216 is secured to a first flange surface 214*a* (shown in FIG. 15) of main housing 214 to form a pump chamber 206 about pump assembly 220. Unlike the pump covers 16, 116 of the previously described embodiments, a three fastener mounting is utilized. Motor cover 218 is secured to a second flange surface 214*b* (shown in FIG. 22) of main housing 214 to form a motor chamber 208 about motor assembly 255. Pump cover 216 and motor cover 218 are secured to the main housing 214 by a plurality of fasteners, such as screws 217. Fluid passage bore plug 232 closes off a passage in main housing 214 that is an artifact of the main housing machining process. As shown in FIG. 17, pump cover 216 has an opening 216*f* in which a first end of input shaft 222 is rotatably supported by a bearing 225. The opposing end of input shaft 222 is rotatably supported by main housing 214.

Figure 18:
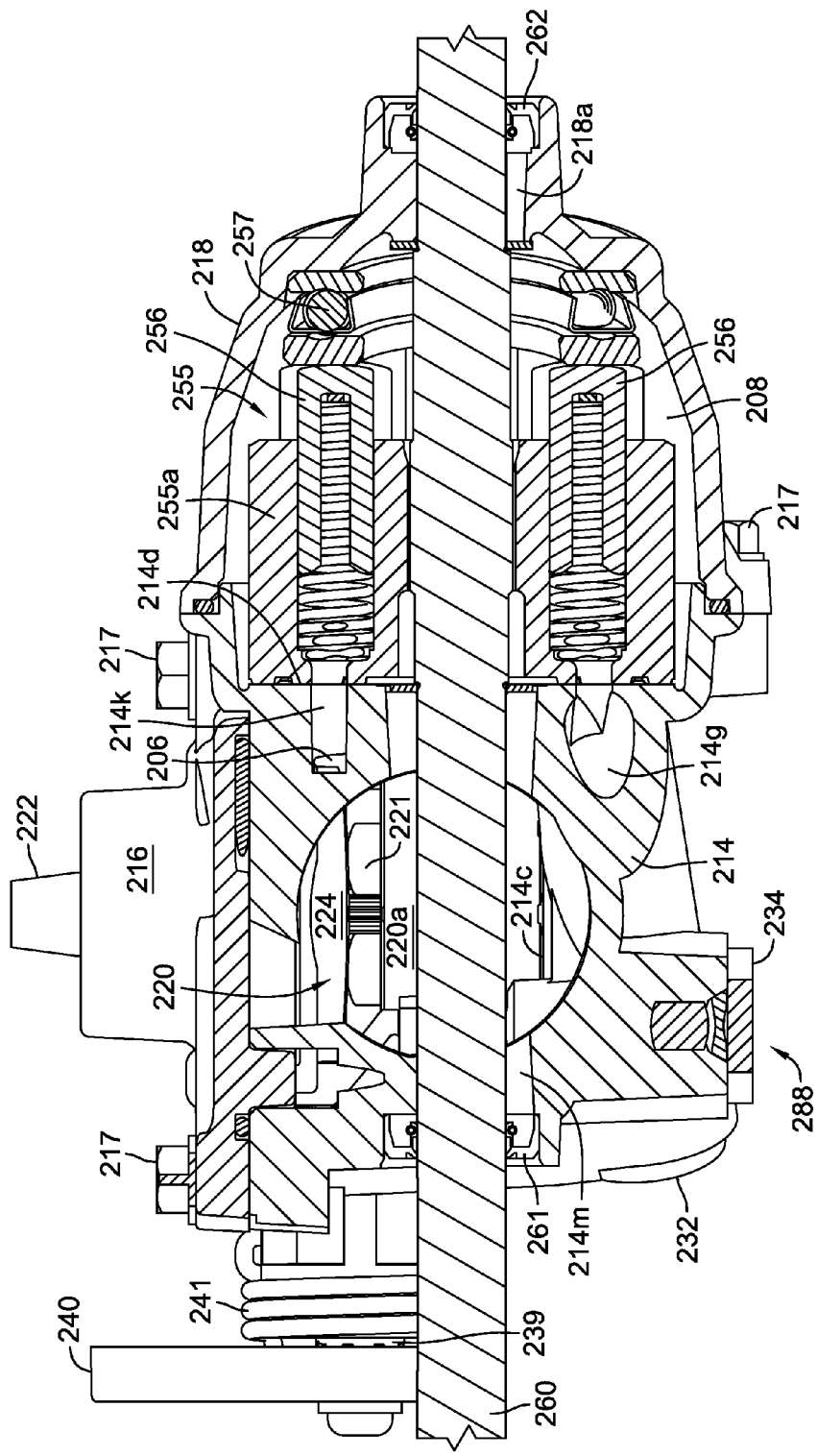
FIG. 18 is a cross-sectional view of a portion of the transmission of FIG. 16 along line 18-18 in FIG. 16.
Figure 19:
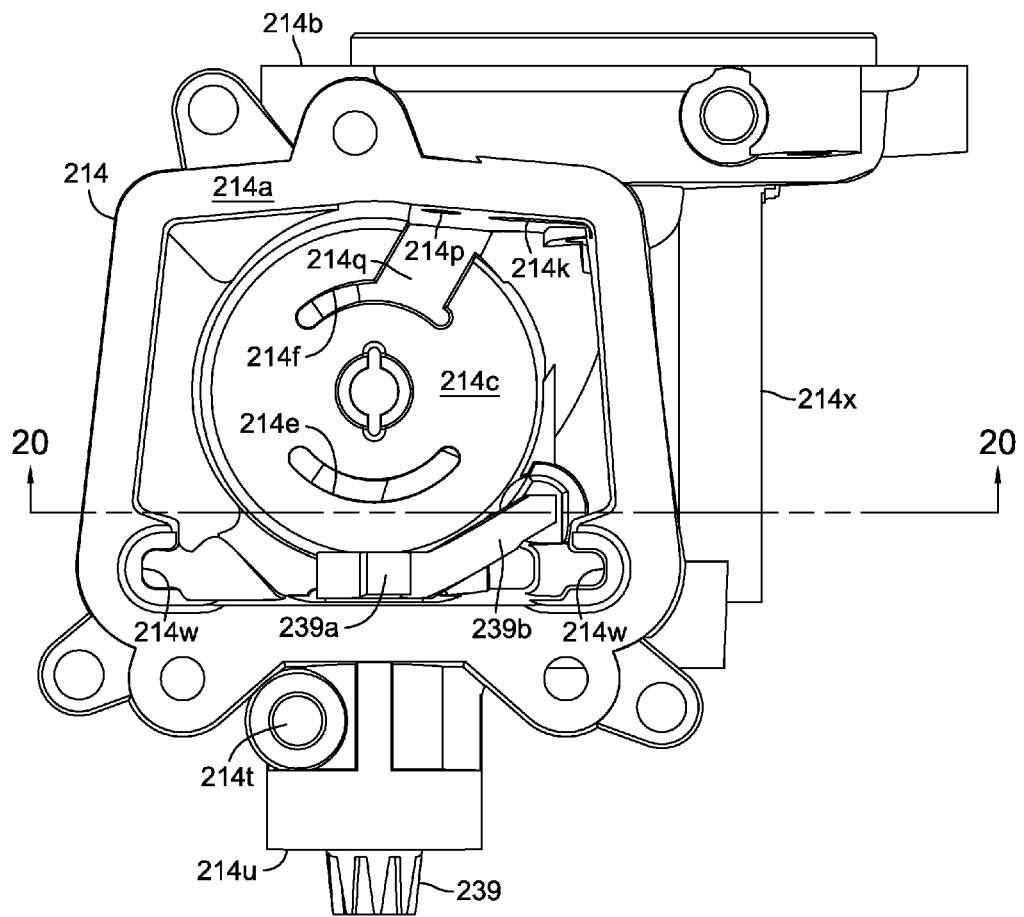
FIG. 19 is a plan view of a portion of the transmission of FIG. 14 with certain components removed for clarity.

Output shaft 260 is rotatably supported by motor cover 218 and main housing 214. A first output shaft seal 261 is provided in main housing 214 and a second output shaft seal 262 is provided in motor cover 218. As shown in FIG. 18, a pressure relief passage 214*m* is formed in main housing 214 leading from pump chamber 206 to output shaft seal 261 to prevent over-pressurization of output shaft seal 261 from any pumping effect attributable to rotation of output shaft 260. Also, a pressure relief passage 218*a* is formed in motor cover 218 leading from motor chamber 208 to output shaft seal 262 to prevent shaft-rotation-induced pressurization of output shaft seal 262.

Main housing 214 also provides a pump running surface 214*c* having arcuate ports 214*e* and 214*f* for pump assembly 220 and a motor running surface 214*d* having arcuate ports 214*r* and 214*s* for motor assembly 255, with the pump running surface 214*c* oriented generally perpendicular to the motor running surface 214*d*. Main housing 214 thereby eliminates the need for a separate center section.

Referring primarily to FIGS. 15, 17, 18 and 19, the output of pump assembly 220 is adjustable via swash plate 224. A trunnion arm 239 for adjusting swash plate 224 passes through an opening 214*u* in a first side of main housing 214. Trunnion arm 239 is connected to a control arm 240 such that rotation of control arm 240 causes rotation of trunnion arm 239. Trunnion arm 239 has a first arm 239*a* that extends radially outward from the rotational axis of trunnion arm 239 and engages and aligns with a slot 224*c* formed in swash plate 224, such that rotation of trunnion arm 239 adjusts the position of swash plate 224. Swash plate 224 includes protrusions 224*a* and 224*b* that come into contact with stop features, such as stop 216*e* shown in FIG. 22, formed in pump cover 216 to limit the movement of swash plate 224 in a first and second direction, respectively. Trunnion arm 239 has a second arm 239*b*, which extends radially outward from the rotational axis of trunnion arm 239 so that its end is positioned proximate to a poppet 288*b* of bypass valve 288 when swash plate 224 is in the neutral position. The function of bypass valve 288 is described in greater detail below.

Figure 15:
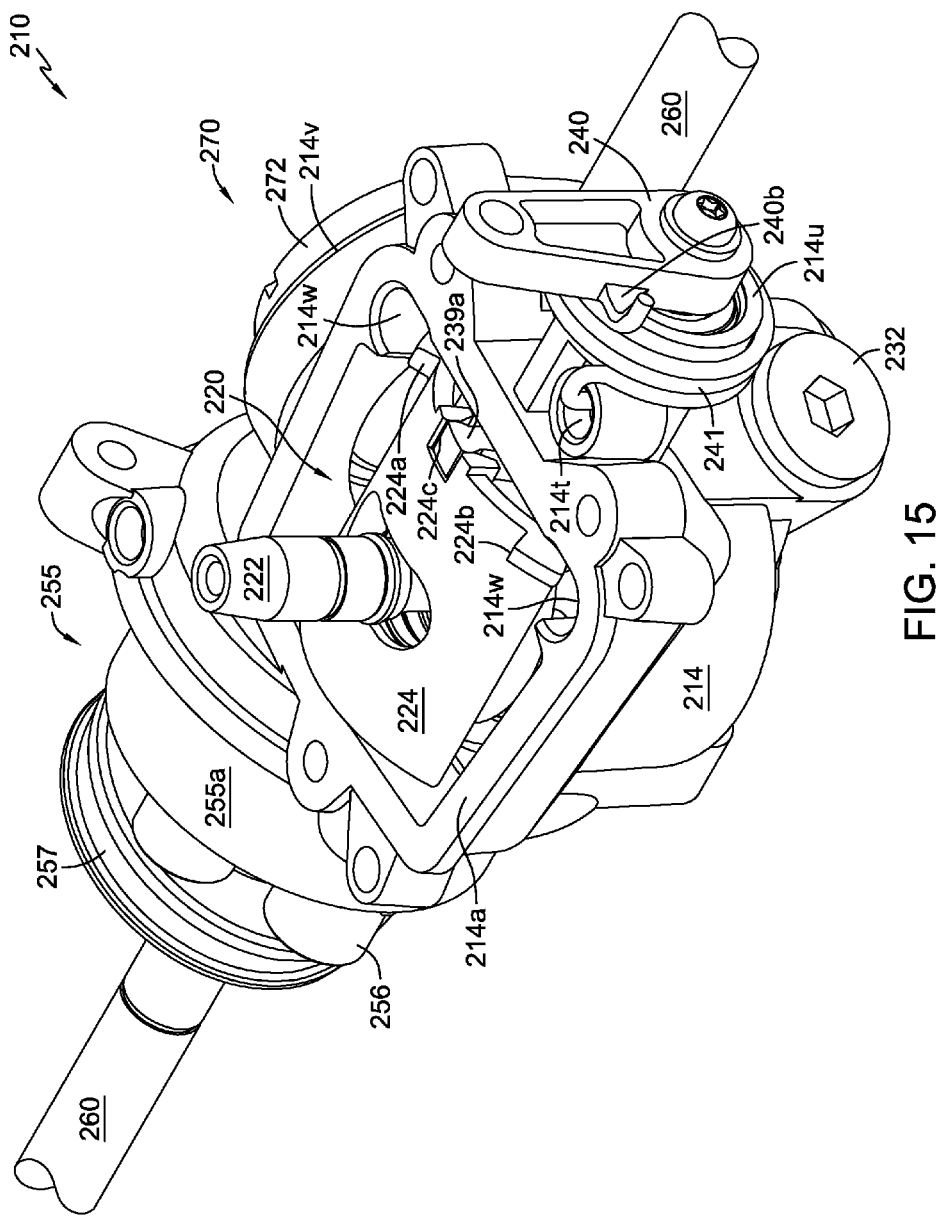
FIG. 15 is a perspective view of the transmission of FIG. 14 with certain components removed for clarity.
Figure 16:
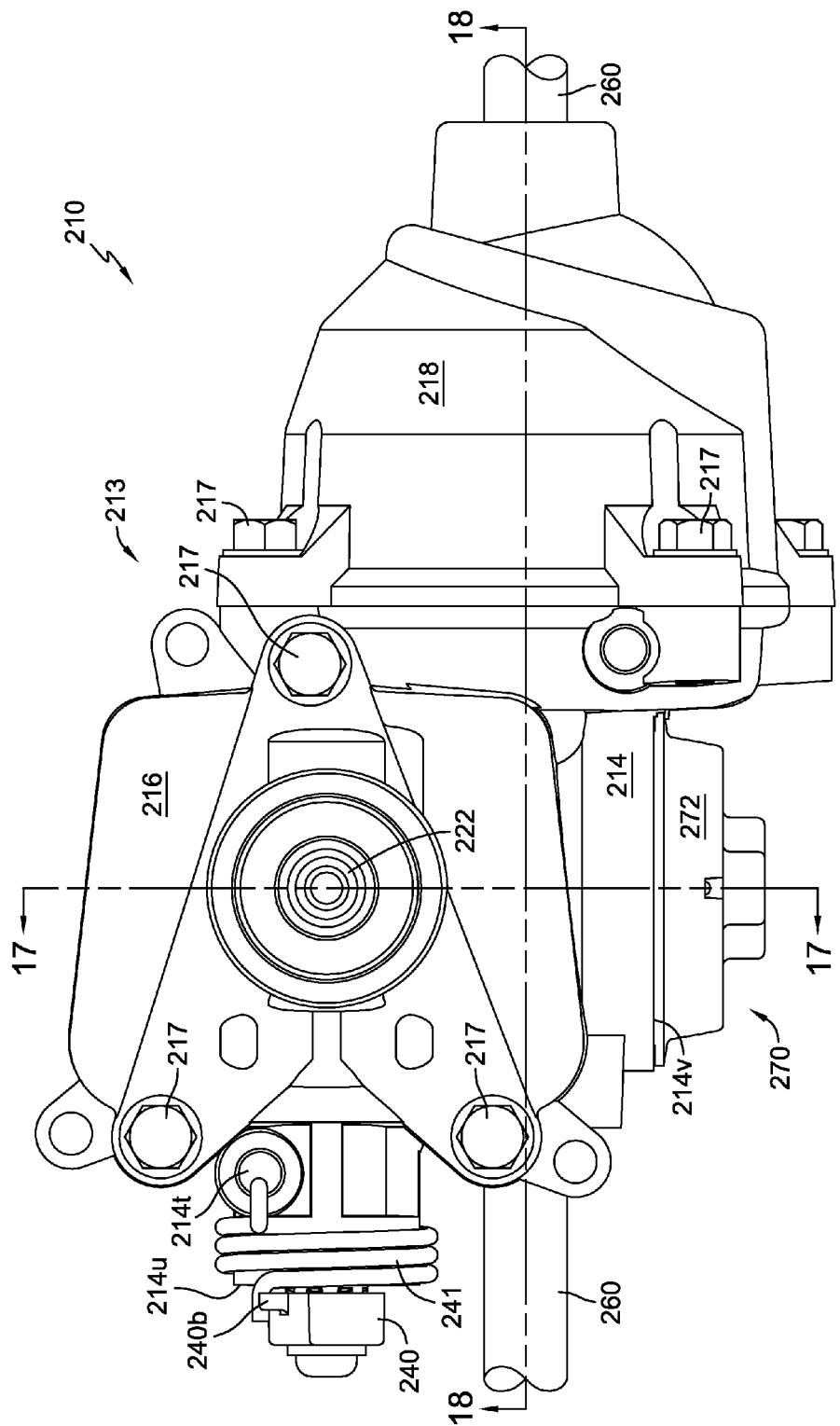
FIG. 16 is a plan view of the transmission of FIG. 14 with certain components removed for clarity.

Referring primarily to FIGS. 15 and 17, the volume and direction of hydraulic fluid flow from pump assembly 220 is controlled by rotating control arm 240. A plurality of pump pistons 221 in pump assembly 220 are in continuous contact with a pump thrust bearing 223 retained in swash plate 224. When an operator rotates control arm 240 in a clockwise or counterclockwise direction by means of controls and linkages (not shown), swash plate 224 is moved in an arc due to its engagement with first arm 239*a*. Movement of swash plate 224 changes the contact angle between the pump pistons 221 of pump assembly 220 and pump thrust bearing 223, thereby providing variable displacement hydraulic output to rotate motor assembly 255 and its motor output shaft 260 at various speeds. It should be understood that in the neutral position, subject to machining tolerances, second arm 239*b* does not crack bypass valve 288.

During a first or "forward" mode of operation, when trunnion arm 239 is rotated from a neutral position in a first direction (counterclockwise for the embodiment shown in FIG. 15), the output flow of pump assembly 220 is increased, thus increasing the output speed of motor 255 and its motor output shaft 260.

The porting and operations of this third embodiment vary from those of the previously described transmissions 10, 110. In the first mode of operation, hydraulic fluid flows between fluid port 214*e* formed in pump running surface 214*c* and fluid port 214*s* formed in motor running surface 214*d* by way of fluid passage 214*g* formed in housing 214 to provide fluid communication between pump assembly 220 and motor assembly 255 in an open hydraulic circuit. This is an open hydraulic circuit in that hydraulic fluid discharged from motor pistons 256 will flow through fluid passage 214*k* to pump chamber 206 instead of being ported directly back to the pump assembly 220. Drain passage 214*p* further allows excess hydraulic fluid in motor chamber 208 to drain into pump chamber 206. Pump assembly 220 draws hydraulic fluid directly from pump chamber 206 via pump inlet passage 214*q* and arcuate port 214*f*. This open hydraulic circuit prevents reverse operation of transmission 210.

Figure 20:
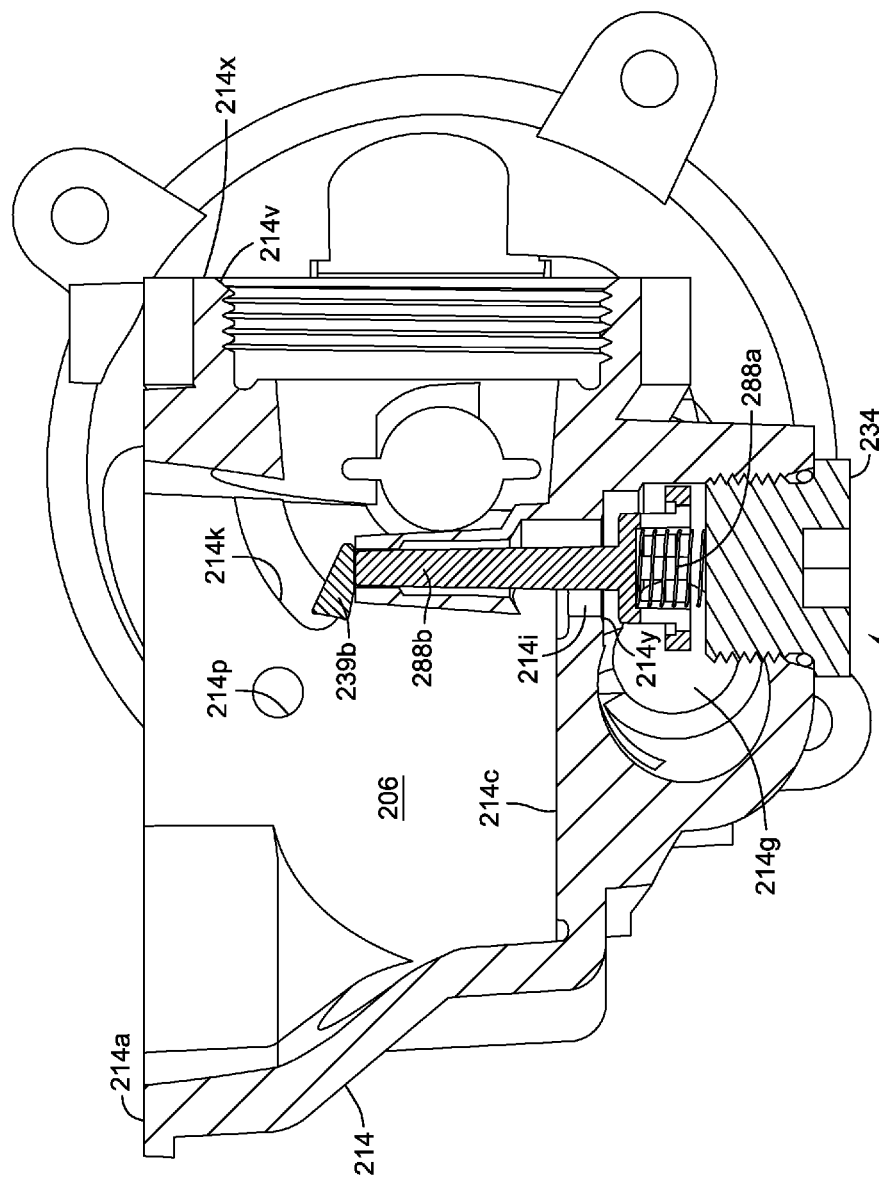
FIG. 20 is a cross-sectional view of a portion of the transmission of FIG. 19 along line 20-20 in FIG. 19.

During a second or "bypass" mode of operation, trunnion arm 239 is rotated from the neutral position in a second, opposite direction (clockwise in FIG. 15) causing the second arm 239*b* to open bypass valve 288 so that fluid communication between motor assembly 255 and pump assembly 220 is broken. Bypass valve 288 may be a poppet style valve having a spring 288*a*, one end of which bears upon a poppet 288*b* to close bypass valve 288 against valve seat 214*y* and prevent communication between fluid passages 214*g* and 214*i* unless second arm 239*b* of trunnion arm 239 bears upon poppet 288*b* to crack valve 288, as shown in FIG. 20. The other end of spring 288*a* bears against bypass valve plug 234 which seals main housing 214. Fluid passage 214*i* is open to pump chamber 206; thus, the discharge from pump assembly 220 via arcuate port 214*e* and fluid passage 214*g* is circulated directly back into pump chamber 206 via fluid passage 214*i* without providing fluid to motor assembly 255. Consequently, an operator of a walk-behind mower so equipped may manually pull the mower backward without difficulty.

A return-to-bypass spring 241 is disposed about trunnion arm 239 and an opening 214*u* on a first side of main housing 214 to bias trunnion arm 239 to a bypass position. One end of return-to-bypass spring 241 bears against projection 240*b* of control arm 240 and the other end extends into and bears upon pocket 214*t* of main housing 214, thus biasing trunnion arm 239 to the second or bypass mode of operation.

As in the first and second embodiments, a fluid expansion bladder assembly 270 is provided to relieve case pressure from transmission 210 and prevent pressurization of hydraulic fluid adjacent various seals of transmission 210 as the fluid temperature rises and the fluid expands during operation of transmission 210. As shown in FIGS. 17 and 20, bladder assembly 270 is located on a second side 214*x* of main housing 214 rather than on the pump cover. Bladder assembly 270 is installed in an expansion bladder port 214*v* formed on the second side 214*x* of main housing 214. Port 214*v* can be internally threaded, as shown, to receive an expansion bladder cap 272. Expansion bladder assembly 270 comprises a chamber 276 defined on one end by the expansion bladder cap 272 and on the opposite end by a membrane 274, wherein membrane 274 seals off pump chamber 206 and is able to expand to accommodate hydraulic fluid expansion.

Figure 21:
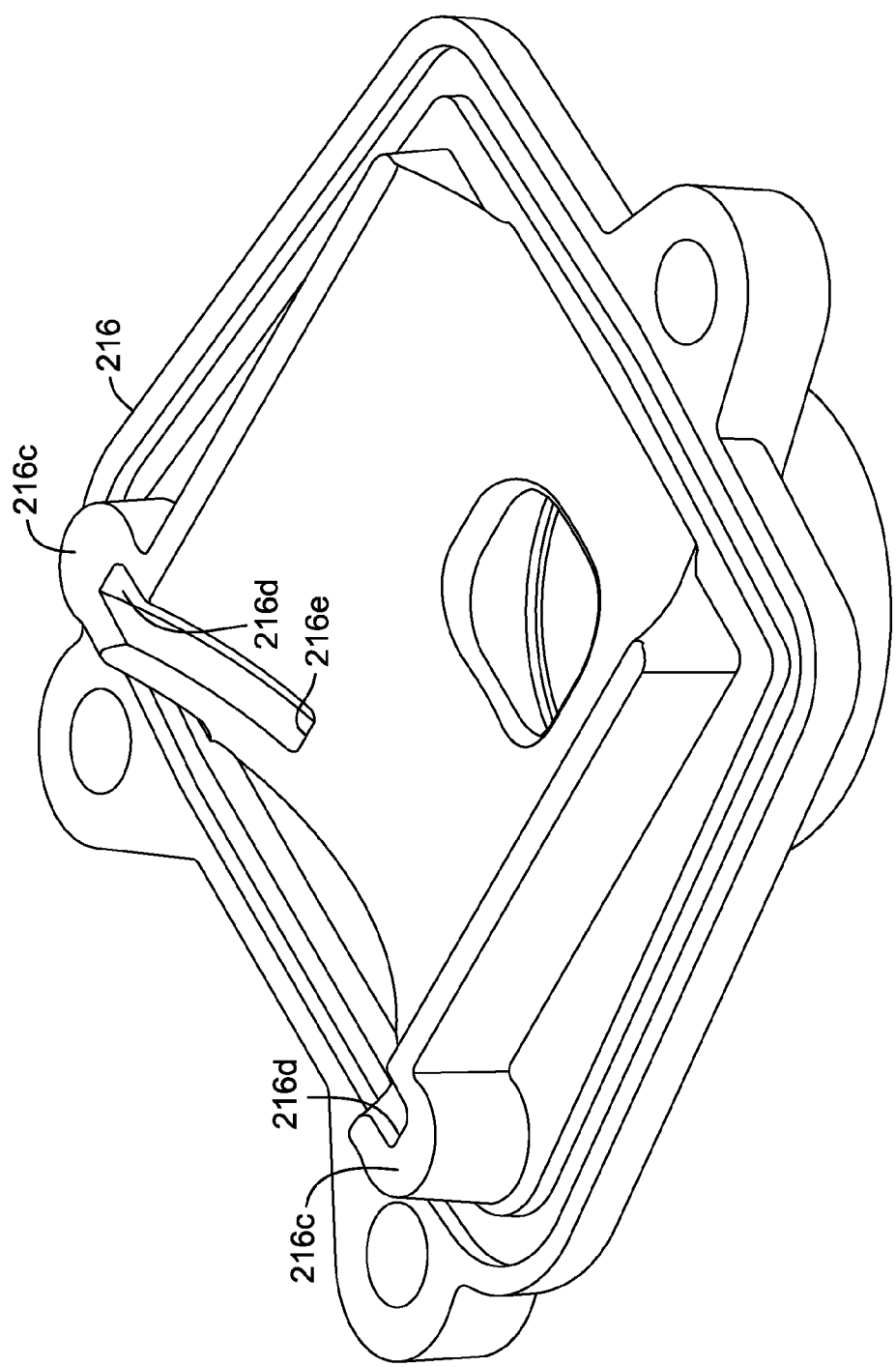
FIG. 21 is a perspective view of the pump cover of the transmission of FIG. 14.
Figure 22:
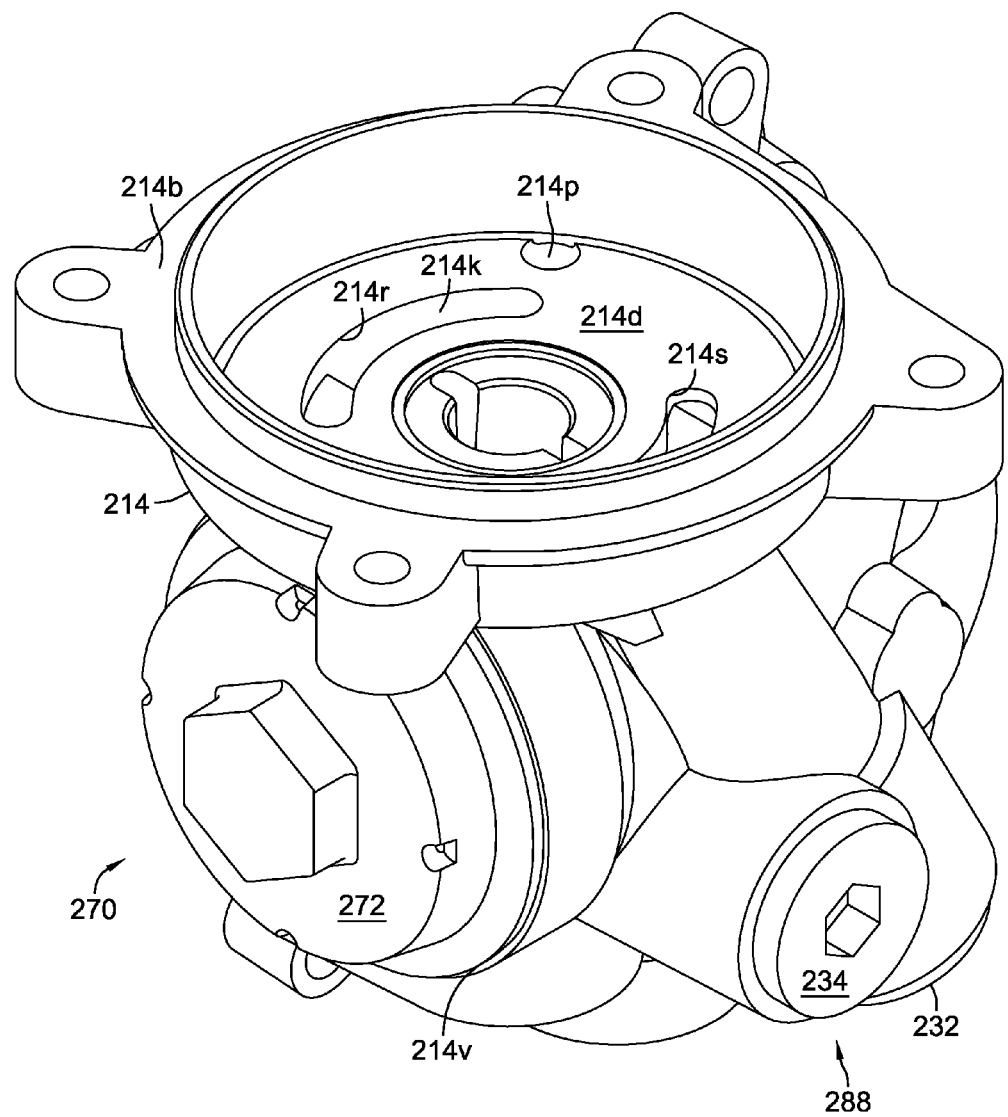
FIG. 22 is a perspective view of the main housing and certain other components of the transmission of FIG. 14.

As shown in FIG. 21, the interior of pump cover 216 has alignment projections 216*c* which mate with alignment pockets 214*w* (shown in FIGS. 15 and 19) to ensure proper alignment of pump cover 216 with main housing 214. Swash plate guide grooves 216*d*, which guide the movement of swash plate 224, are formed integrally with the alignment projections 216*c* to ensure accurate location of swash plate 224 when pump cover 216 is attached to main housing 214.

While one or more specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:
1. A hydraulic drive mechanism, comprising:
a housing comprising a first housing component joined to a second housing component to form a sump, the first housing component having a pump running surface, a motor running surface and internal porting formed inside the first housing component to join the pump running surface and the motor running surface;

a valve disposed in a valve bore formed in the first housing component, the valve bore having a first end open to the sump on an internal surface of the first housing component and a second end open to the internal porting;

a pump rotatably disposed on the pump running surface and a motor disposed on the motor running surface, wherein both the pump and the motor are hydraulically connected to the internal porting;

an output shaft driven by the motor, the output shaft having a first axis of rotation and comprising a first shaft end extending out a first side of the housing and a second shaft end extending outside a second side of the housing opposite the first side;

a pump input shaft engaged to and driving the pump, wherein the pump input shaft has a second axis of rotation which lies on a common plane with the first axis of rotation; and a swash plate engaged to the pump, and a trunnion comprising a first arm engaged to the swash plate to rotate the swash plate to vary the output of the pump, and a second arm which rotates with the first arm, the second arm having an operative end that is capable of engaging the valve, whereby the operative end of the second arm opens the valve to permit a hydraulic connection between the internal porting and the sump through the valve bore when the trunnion is rotated to a predetermined position.

2. The hydraulic drive mechanism of claim 1, wherein the motor comprises a gerotor motor.

3. The hydraulic drive mechanism of claim 1, further comprising a motor cover engaged to at least the first housing component at the first side thereof to form a chamber for the motor, and the first end of the output shaft is at least partially supported by the motor cover.

4. The hydraulic drive mechanism of claim 1, wherein the second housing component comprises a pump cover.

5. The hydraulic drive mechanism of claim 1, further comprising a first protrusion extending from the swash plate for engaging a structure within the housing to limit the range of motion of the swash plate in a first direction.

6. The hydraulic drive mechanism of claim 5, further comprising a second protrusion extending from the swash plate for engaging a second structure within the housing to limit the range of motion of the swash plate in a second direction.

7. A hydraulic drive mechanism, comprising:
a housing having a porting system disposed therein;
a hydraulic pump comprising a pump cylinder block rotatably disposed on a pump running surface and a hydraulic motor comprising a motor cylinder block rotatably disposed on a motor running surface, where the hydraulic pump is connected to the hydraulic motor through the porting system;
a pin disposed in the housing for lifting the motor cylinder block off the motor running surface and thereby opening the porting system to a sump formed in the housing;
a bypass cam having a first end disposed external to the housing and a second end disposed inside the housing, the second end having a cam structure engaged to the pin, whereby rotation of the bypass cam causes the pin to lift the motor cylinder block off the motor running surface to place the hydraulic drive mechanism into a bypass state;
a swash plate engaged to the hydraulic pump, and a control mechanism engaged to rotate the swash plate to control output of the hydraulic pump, the control mechanism comprising a trunnion engaged to the swash plate to rotate the swash plate, a control arm disposed external to the housing and engaged to the trunnion and operatively engaged to the first end of the bypass cam, and a bypass actuation arm extending from the control arm and disposed between the control arm and the bypass cam, wherein the bypass actuation arm contacts the bypass cam to cause rotation of the bypass cam and move the pin when the control arm is rotated to a first predetermined position and the bypass actuation arm does not contact the bypass cam when the control arm is rotated to at least a second predetermined position.

8. The hydraulic drive mechanism of claim 7, wherein the housing comprises a plurality of housing elements joined together to form the sump.

9. The hydraulic drive mechanism of claim 7, wherein the housing comprises a first housing component joined to a second housing component, the first housing component having the pump running surface and the motor running surface formed thereon, and the porting is formed inside the first housing component.

10. The hydraulic drive mechanism of claim 9, further comprising an output shaft driven by the hydraulic motor, the output shaft having a first axis of rotation, a first shaft end extending out a first side of the housing and a second shaft end extending outside a second side of the housing opposite the first side.

11. The hydraulic drive mechanism of claim 10, further comprising a motor cover engaged to at least the first housing component at the second side thereof to form a chamber for the hydraulic motor, and the second end of the output shaft is at least partially supported by the motor cover.

12. The hydraulic drive mechanism of claim 11, further comprising a first shaft seal in the first housing component, where the first end of the output shaft extends through the first shaft seal, a second shaft seal in the motor cover, where the second end of the output shaft extends through the second shaft seal, and at least one pressure relief passage formed adjacent to either the first shaft seal or the second shaft seal to relieve pressure to the sump.

13. The hydraulic drive mechanism of claim 7, further comprising a first protrusion extending from the swash plate for engaging a structure within the housing to limit the range of motion of the swash plate in a first direction, and a second protrusion extending from the swash plate for engaging a second structure within the housing to limit the range of motion of the swash plate in a second direction.

14. The hydraulic drive mechanism of claim 7, wherein the housing comprises a plurality of housing elements joined together to form the sump, and the porting system is formed in one of the plurality of housing elements.

\* \* \* \* \*